(12) United States Patent
Tohda et al.

(10) Patent No.: US 7,281,971 B2
(45) Date of Patent: Oct. 16, 2007

(54) AIR CONDITIONER FOR VEHICLE

(75) Inventors: Isao Tohda, Hiroshima (JP); Kouji Iwasaka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 340 days.

(21) Appl. No.: 10/934,519

(22) Filed: Sep. 7, 2004

(65) Prior Publication Data
US 2005/0061498 A1 Mar. 24, 2005

(30) Foreign Application Priority Data
Sep. 24, 2003 (JP) ............... 2003-330960
Sep. 24, 2003 (JP) ............... 2003-330961

(51) Int. Cl.
*B60H 1/26* (2006.01)
(52) U.S. Cl. .............. 454/143; 454/139; 237/12.3 B
(58) Field of Classification Search .......... 454/143, 454/139; 237/12.3 R, 12.3 B
See application file for complete search history.

(56) References Cited

U.S. PATENT DOCUMENTS

| | | | | |
|---|---|---|---|---|
| 4,840,115 A | * | 6/1989 | Johnson et al. | 454/120 |
| 5,673,964 A | * | 10/1997 | Roan et al. | 296/208 |
| 5,950,722 A | * | 9/1999 | Huetteman | 165/202 |
| 6,213,865 B1 | | 4/2001 | Odebrecht | |
| 6,261,173 B1 | * | 7/2001 | Odebrecht | 454/151 |
| 6,321,996 B1 | * | 11/2001 | Odebrecht et al. | 237/12.3 A |
| 6,341,814 B1 | * | 1/2002 | Honninger et al. | 296/208 |
| 6,772,834 B2 | * | 8/2004 | Iwamoto et al. | 165/271 |
| 2001/0045278 A1 | | 11/2001 | Iwamoto et al. | |

FOREIGN PATENT DOCUMENTS

| | | |
|---|---|---|
| DE | 41 10 229 A1 | 10/1992 |
| DE | 196 33 672 A1 | 3/1997 |
| DE | 196 36 210 C1 | 7/1997 |
| EP | 1 020 308 | 7/2000 |
| JP | 07 266841 | 10/1995 |
| JP | 07-266841 | 10/1995 |
| JP | 2002-012020 | 1/2002 |
| JP | 2002012020 | 1/2002 |
| WO | WO 95/17314 A | 6/1995 |

\* cited by examiner

*Primary Examiner*—Derek S. Boles
(74) *Attorney, Agent, or Firm*—Nixon Peabody LLP; Donald R. Studebaker

(57) ABSTRACT

In an air conditioner for a vehicle including a vehicle roof capable of opening, there are provided a driver seat and a passenger seat which are provided at right and left sides in a vehicle compartment, plural conditioned-air blowoff ports provided for the driver seat and the passenger seat respectively, and an air conditioning control device operative to adjust respective characteristics of conditioned air for the driver seat and the passenger seat, separately. Accordingly, needs of each passenger on the driver seat and the passenger seat during a vehicle driving with the vehicle roof open can be attained, thereby improving comfortableness of air conditioning.

16 Claims, 23 Drawing Sheets

|  | Mode | | | | | | | | Temperature Adjusting | | |
|---|---|---|---|---|---|---|---|---|---|---|---|
|  | Vent Mode m1 | Roof Open Vent Mode m2 | Bi-Level Mode m3 | Foot Mode m5 | Roof Open Foot Mode m4 | Def/Foot Mode m6 | Def Mode m7 | Shut Mode m8 | t18 | - | t32 |
| Door for Neck D3 | ○ | ○ | ○ | × | ○ | × | × | × | - | - | - |
| Door for Back D4 | × | ○ | × | ○ | ○ | ○ | × | × | - | - | - |
| Door for Tunnel D5 | × | ○ | ○ | ○ | ○ | ○ | ○ | × | - | - | - |
| Door for Thigh D8 | × | ○ | × | × | ○ | × | × | × | - | - | - |
| Door for Foot D9 | × | × | ○ | ○ | ○ | ○ | × | × | - | - | - |
| Def Door D10 | × | × | × | × | × | ○ | ○ | × | - | - | - |
| Air Mix Door D1, D2 | - | - | - | - | - | - | - | - | a | Auto Control | b |

FIG. 20

( ○ means Door Open, × means Door Closed )

AIR CONDITIONER FOR VEHICLE

BACKGROUND OF THE INVENTION

The present invention relates to an air conditioner for a vehicle including a vehicle roof capable of opening, like a so-called open car.

Conventionally, the following air conditioner is known as an air conditioner of the open car.

Namely, it is the air conditioner in which there is provided a blowoff port to blow off a conditioned air toward foot portions of vehicle passengers on both side faces of a center console which is located between a driver seat and a passenger seat, and when a roof detecting switch detects opening of a vehicle roof, an air conditioning mode is changed to a roof-open mode and thus the conditioned air is blown off from the blowoff port toward the foot portions of passengers, thereby providing the passengers with comfortable feelings by reducing uncomfortable feelings due to cool air coming into a passenger compartment when the vehicle roof is open (see, for example, Japanese Patent Laid-Open Publication No. 2002-12020).

Meanwhile, another type of air conditioner is also known, in which there is provided a state detecting means for detecting an open state of a folding top (vehicle roof), and when the state detecting means detects the folding top open, a blowoff port provided at a front header blows off some air so as to prevent open air outside from coming into the passenger compartment from the open roof during driving the vehicle, thereby performing an efficient air conditioning by the air conditioner (see, for example, Japanese Patent Laid-Open Publication No. 7-266841).

However, both of the above-described prior arts have a problem that respective characteristics of conditioned air for the driver seat and the passenger seat can not be adjusted separately (independently).

Namely, for the open car, an air conditioning control that can direct the conditioned air to the passengers directly is effective, and the control that can adjust the air conditioning separately for respective passengers on respective seats (a driver seat and a passenger seat, or a right seat and a left seat) is preferable to satisfy each passenger's needs when especially the vehicle roof is open. That is, when the vehicle roof is closed, the passengers on the both seats may enjoy properly the temperature (air conditioning condition) of the vehicle compartment together and thus there may be not any problems in particular in this case. However, the situation during the roof open should be different. That is why the above-described air conditioning control will be needed to the open car.

SUMMARY OF THE INVENTION

The present invention has been devised in view of the above-mentioned problem, and an object of the present invention is to provide an air conditioner for a vehicle that can satisfy needs of each passenger on a driver seat and a passenger seat during a vehicle driving with a vehicle roof open, thereby improving comfortableness of air conditioning.

According to the present invention, there is provided an air conditioner for a vehicle including a vehicle roof capable of opening, comprising a driver seat and a passenger seat which are provided at right and left sides in a vehicle compartment, plural conditioned-air blowoff ports provided for the driver seat and the passenger seat, respectively, and an air conditioning control device operative to adjust respective characteristics of conditioned air for the driver seat and the passenger seat, separately.

Accordingly, the conditioned air whose respective characteristics for the driver seat and the passenger seat are adjusted separately by the air conditioning control device can be blown off from the conditioned-air blowoff ports for the driver seat and the passenger seat. Thus, since the air conditioning is adjusted separately for the driver seat and the passenger seat, the air conditioning control can be attained so as to satisfy needs of each passenger on the driver seat and the passenger seat during the vehicle driving with the vehicle roof open, thereby improving the comfortableness of air conditioning.

According to a preferred embodiment of the invention, there is provided air conditioning adjusting operating means for adjusting the air conditioning control device, wherein the air conditioning adjusting operating means is configured so as to adjust the conditioned air for the driver seat and the passenger seat by changing one assembled operating member.

Accordingly, since the characteristics for the driver seat and the passenger seat can be adjusted by changing the one assembled operating member, a simple structure can be obtained with only the one assembled operating member. Namely, there is no need to provide two or more assembled operating members for the driver seat and the passenger seat, respectively.

According to another preferred embodiment of the invention, the one assembled operating member includes a mode changing operating portion, an air-amount changing operating portion and a temperature adjusting operating portion, and there is provided a seat-mode changing operating portion which changes at least the mode changing operating portion and the temperature adjusting operating portion to a driver-seat operating mode and a passenger-seat operating mode.

Herein, mode changing by the mode changing operating portion may be configured so as to change to a vent mode, a roof open vent mode, a bi-level mode, a foot mode, a roof open foot mode, a def/foot mode, a def mode and so on. Also, air-amount changing (adjusting) by the air-amount changing operating portion may be configured so as to change to large and small, or strong and weak of the amount of blown off air, and temperature adjusting by the temperature adjusting operating portion may be configured so as to change to high and low.

Accordingly, since air-amount adjusting and temperature adjusting can be provided separately for the driver seat and the passenger seat by the seat-mode changing operating portion, a further proper air-conditioning control for each passenger can be attained.

According to another preferred embodiment of the invention, the seat-mode changing operating portion includes a dual mode operative to adjust the identical air conditioning characteristics for the driver seat and the passenger seat thereby.

Accordingly, since the dual mode selected by the seat-mode changing operating portion can provide the driver seat and the passenger seat with the identical air conditioning characteristics, such simple selecting operation can improve an easy use.

According to another preferred embodiment of the invention, a state of the vehicle roof is detected, and the separate adjusting of the conditioned air for the driver seat and the passenger seat is operative when the vehicle roof is in an open state, whereas the dual mode is operative when the vehicle roof is in a closed state.

Accordingly, the air conditioning can be adjusted separately for the driver seat and the passenger seat during the roof open for the purpose of satisfying each passenger's needs, and can be adjusted at the dual mode during the roof closed for the purpose of a load reducing. As a result, the efficient air conditioning can be attained, preventing too much load from being applied to the air conditioner.

According to another preferred embodiment of the invention, there is further provided a passenger-seat shutdown mode to stop the air conditioning control for the passenger seat.

Accordingly, since the air conditioning control for the passenger seat is stopped by selecting the passenger-seat shutdown mode, the air conditioning focused on the driver seat can be attained in this case and thereby attaining an easy operation.

According to another preferred embodiment of the invention, there is provided a passenger-seat shutdown switch to select the passenger-seat shutdown mode.

Accordingly, the passenger-seat shutdown mode can be selected simply by the passenger-seat shutdown switch.

According to another preferred embodiment of the invention, a mode including a defroster for the passenger seat is prohibited from being selected during the separate adjusting of the conditioned air for the passenger seat.

Herein, the mode including the defroster may be configured of a def mode (specifically, a defroster mode) and a def/foot mode.

Accordingly, since selecting the mode including the defroster is prohibited during the separate adjusting of the conditioned air for the passenger seat, a mistaken selection of the defroster mode or the like against the driver's expectation can be prevented certainly.

According to another preferred embodiment of the invention, there is further provided plural conditioned-air blowoff modes, wherein there are provided respective modes for an open state of the vehicle roof and a closed state of the vehicle roof, and the air conditioning control device is configured so as to be further operative to select the respective modes.

Herein, the plural conditioned-air blowoff ports may be configured of neck blowoff ports to blow off the conditioned air toward the necks of the respective vehicle passengers on the driver seat and the said passenger seat, back blowoff ports to blow off the conditioned air toward the backs of the above vehicle passengers, thigh blowoff ports to blow off the conditioned air toward the thighs of the above vehicle passengers, foot blowoff ports to blow off the conditioned air to the feet of the above vehicle passengers. Also, the plural conditioned-air blowoff modes may comprise a vent mode (wherein the conditioned air is mainly blown off toward the passenger necks), a roof open vent mode, a bi-level mode, a foot mode, a roof open foot mode, a def/foot mode, a def mode, and a shut mode corresponding to a full closed mode.

Accordingly, since the air conditioning device selects the modes which respectively correspond to the open state of the vehicle roof (roof open state) and the closed state of the vehicle roof (roof closed state), preferable modes for each opening state of the vehicle roof can be selected. Thus, the comfortable air conditioning can be provided for both opening and closed states of the vehicle roof, and particularly even if the roof is open, the passengers can obtain comfortable air conditioning.

According to another preferred embodiment of the invention, the air conditioning control device includes a mode changing operating portion to select the respective modes manually.

Herein, the mode changing operating portion may comprise a mode control dial.

Accordingly, the needed mode can be selected manually by the passenger operating the mode changing operating portion according to the roof open state and the roof closed state.

According to another preferred embodiment of the invention, there is further provided plural conditioned-air blowoff modes, wherein the air conditioning control device is configured so as to be further operative to select automatically the conditioned-air blowoff ports in the conditioned-air blowoff modes according to the state of the vehicle roof.

Accordingly, since the air conditioning control device selects automatically the conditioned-air blowoff ports of the conditioned-air blowoff modes according to the state of the vehicle roof, proper modes can be selected automatically according to the opening state of the vehicle roof respectively. Thus, no manual operation for the mode selection is necessary, and the comfortable air conditioning can be provided for both opening and closed states of the vehicle roof, and particularly even if the roof is open, the passengers can obtain comfortable automatic air conditioning.

According to another preferred embodiment of the invention, the conditioned-air blowoff ports include at least a neck blowoff port to blow off the conditioned air toward the neck of a vehicle passenger on the driver seat and/or the passenger seat.

Accordingly, the air around the neck of the passenger can be air-conditioned efficiently by the conditioned air from the neck blowoff port.

According to another preferred embodiment of the invention, the conditioned-air blowoff ports include at least a back blowoff port to blow off the conditioned air toward the back of a vehicle passenger on the driver seat and/or the passenger seat.

Accordingly, the air around the back of the passenger can be air-conditioned efficiently by the conditioned air from the back blowoff port.

According to another preferred embodiment of the invention, the conditioned-air blowoff ports include at least a thigh blowoff port to blow off the conditioned air toward the thigh of a vehicle passenger on the driver seat and/or said passenger seat.

Accordingly, the air around the thigh of passenger can be air-conditioned efficiently by the conditioned air from the thigh blowoff port.

According to another preferred embodiment of the invention, the conditioned-air blowoff ports include at least a thigh blowoff port and a foot blowoff port to blow off the conditioned air respectively toward the thigh and the foot of a vehicle passenger on the driver seat and/or the passenger seat, and there is provided an opening-and-closing means to control the both blowoff ports together which is located upstream of the ports.

Accordingly, the air around the thigh and/or the foot of the passenger can be air-conditioned efficiently by the conditioned air from the thigh blowoff port and/or the foot blowoff port, and the upstream of the thigh blowoff port and the foot blowoff port can be controlled by the opening-and-closing means at the same time.

According to another preferred embodiment of the invention, there is further provided a vent mode to blow off the conditioned air toward the neck of a vehicle passenger on the driver seat and/or the passenger seat, wherein the conditioned air is operative to be blown off only from a neck blowoff port to blow off the conditioned air toward the neck of a vehicle passenger on the driver seat and/or the passenger seat when the vehicle roof is in the closed state, whereas the conditioned air is operative to be blown off only from the neck blowoff port and another blowoff port when the vehicle roof is in the open state.

Accordingly, since the outside air does not come into the vehicle compartment from the roof when the vehicle roof is in the closed state, the passenger can feel sufficiently the comfortable conditioned air from the neck blowoff port. Meanwhile, the outside air comes into the vehicle compartment from the roof when the vehicle roof is in the open state and therefore the conditioned air only from the neck blowoff port may be not enough for the passenger. However, the conditioned air can be blown off from the neck blowoff port and another blowoff port, thereby air-conditioning the passenger effectively.

Namely, the proper air conditioning where the passenger can feel the conditioned air sufficiently can be provided according to the roof closed state and the roof open state.

According to another preferred embodiment of the invention, the conditioned air is operative to be blown off from the neck blowoff port, a back blowoff port to blow off the conditioned air toward the back of the vehicle passenger on the driver seat and/or the passenger seat, and a thigh blowoff port to blow off the conditioned air toward the thigh of the vehicle passenger on the driver seat and/or the passenger seat when the vehicle roof is in the open state at the vent mode.

Herein, the roof open state at the above-described vent mode corresponds to the roof open vent mode.

Accordingly, since the conditioned air is blown off from many blowoff ports during the roof open state, the air conditioning can be provided more properly regardless of the outside air coming into the vehicle compartment.

According to another preferred embodiment of the invention, there is further provided a foot mode to blow off the conditioned air toward the foot of a vehicle passenger on the driver seat and/or the passenger seat, wherein the conditioned air is prevented from being blown off from a neck blowoff port to blow off the conditioned air toward the neck of a vehicle passenger on the driver seat and/or the passenger seat when the vehicle roof is in the closed state.

Accordingly, although the foot mode allows warm conditioned air to be blown off, this warm conditioned air is prevented from being blown off from the neck blowoff port toward the neck of the passenger during the roof closed state, thereby avoiding to provide an uncomfortable feeling to the passenger.

According to another preferred embodiment of the invention, the conditioned air is operative to be blown off from the foot blowoff port and at least another blowoff port when the vehicle roof is in the open state at the foot mode.

Herein, the roof open state at the above-described foot mode corresponds to the roof open foot mode.

When the vehicle roof is open, the outside air comes into the vehicle compartment from the open roof, and thus it may difficult for the passenger to feel the proper air conditioning by the conditioned air only from the foot blowoff port. However, according to the above structure, the conditioned air is blown off from the foot blowoff port and another blowoff port during the roof open state, and thereby the passenger can feel more comfortable air conditioning.

Other features aspects, and advantages of the present invention will become apparent from the following description of the invention which refers to the accompanying drawings.

BRIEF DESCRIPTION OF THE DRAWINGS

FIG. 20 is an explanatory diagram of a map stored in RAM.
FIG. 22 is an explanatory diagram when an auto-changing switch is turned ON.

DETAILED DESCRIPTION OF THE INVENTION

Figure 1:
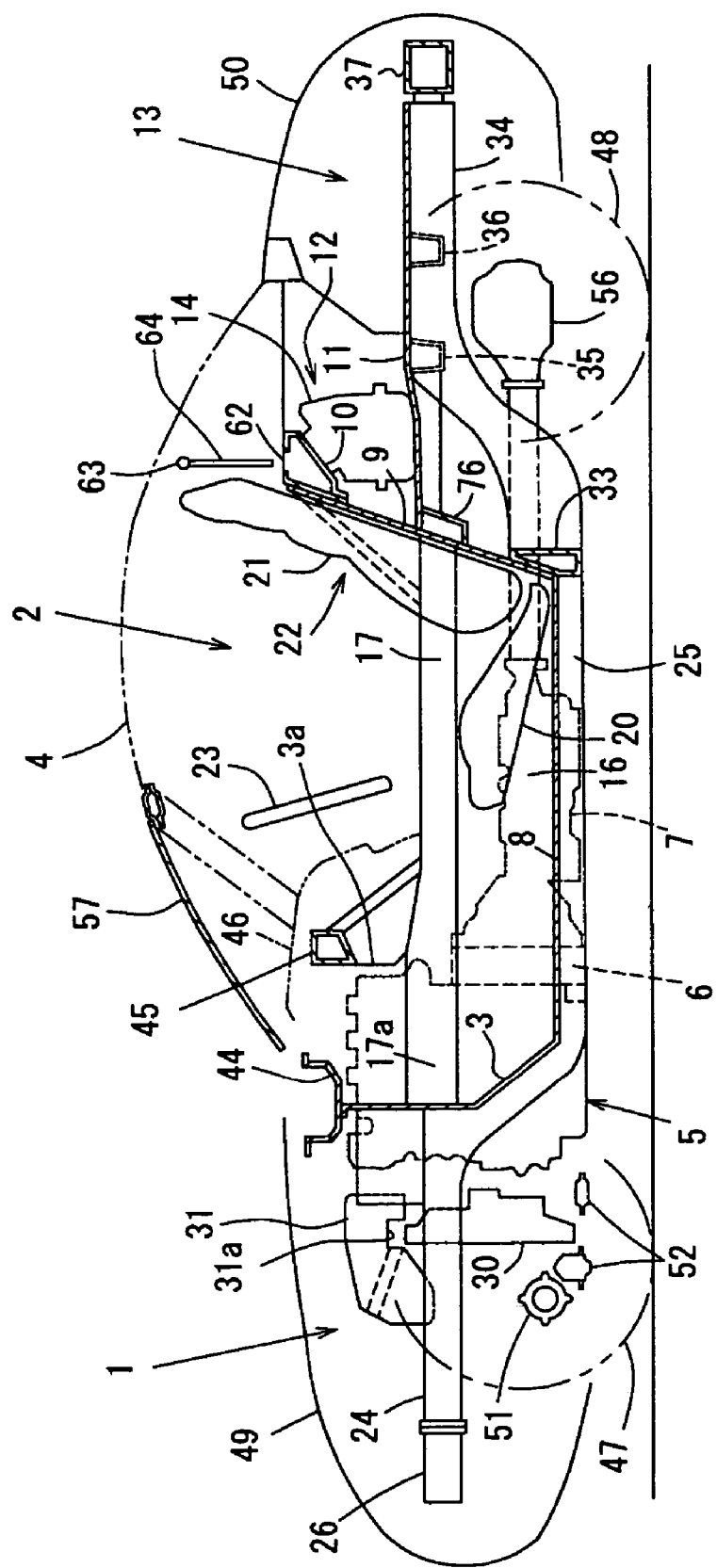
FIG. 1 is a schematic side view of an open car equipped with an air conditioner for a vehicle according to the present invention.

An exemplary embodiment will be described in detail referring to the drawings.

The drawings illustrate an air conditioner for a vehicle. Firstly, a structure of a vehicle body will be described referring to FIGS. 1 through 3. Herein, arrows F, R, IN, and OUT denote respectively a forward direction, a backward direction, an inside direction, and an outside direction of the vehicle in the drawings.

Figure 2:
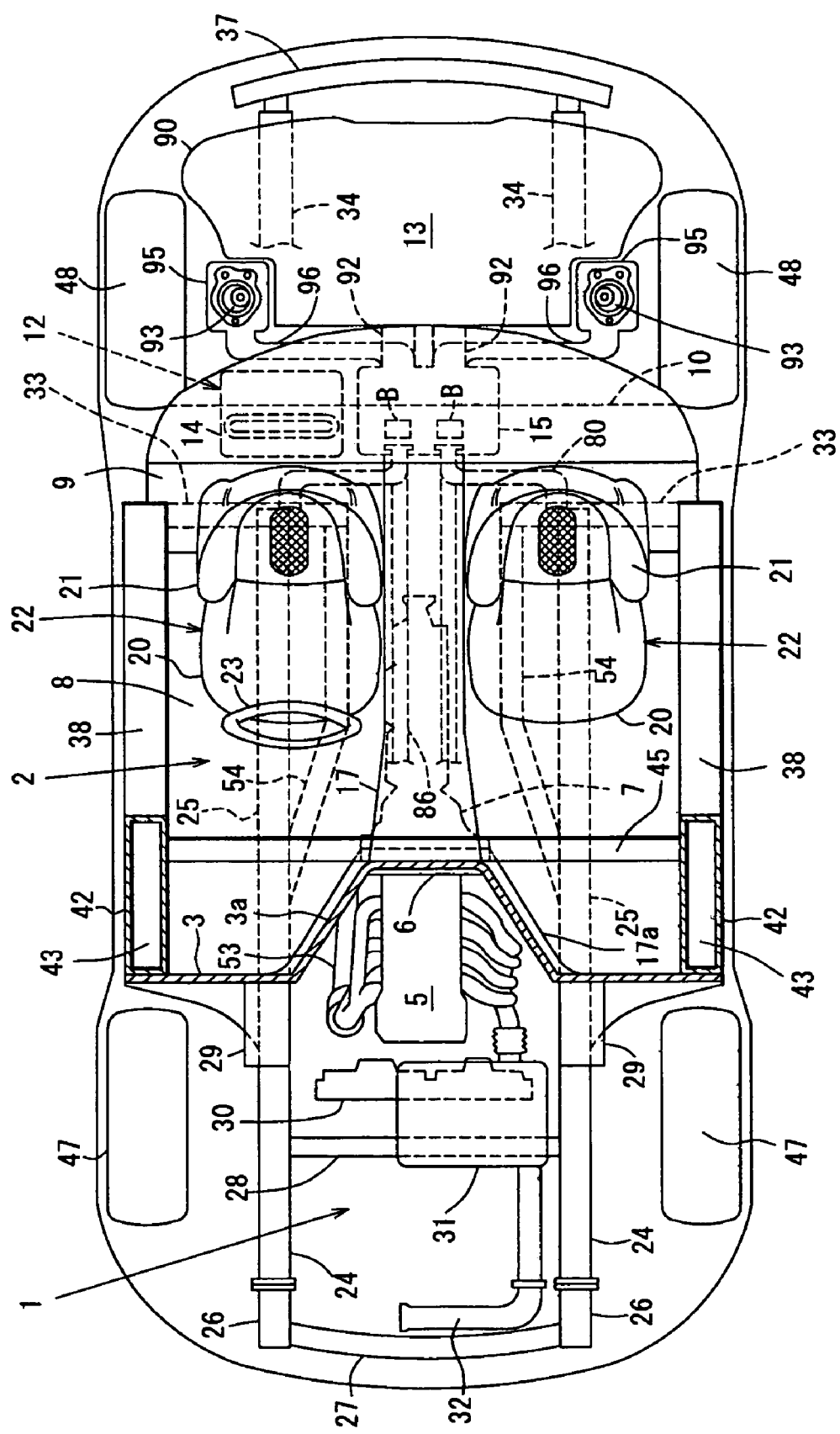
FIG. 2 is a plan view of FIG. 1.

In a side view of FIG. 1 and a plan view of FIG. 2, a dash lower panel 3 (a dash panel) separates a passenger compartment 2 from an engine room 1 in a longitudinal direction of the vehicle. An upper part of the passenger compartment 2 is covered by a vehicle roof 4 (a movable roof) which is capable of opening. A central part of the dash lower panel 3 in a width direction of the vehicle is recessed backward to form a recess portion 3a, and an engine 5 as a drive device is disposed in the recess portion 3a.

The engine 5 is disposed in the longitudinal direction of the vehicle and comprises an ISG unit 6 (Integrated Starter Generator Unit, functioning as both a starter and a generator, which includes a stator and a rotor in a case, in which the rotor is rotated by a drive shaft such as a propeller shaft to produce electric power). Further, a transmission 7 is disposed behind the ISG unit 6 so as to be connected continuously to the ISG unit 6 in a tunnel portion 16 of a floor panel 8, and the engine 5, the ISG unit 6 and the transmission 7 constitute a power train.

Further, the floor panel 8 is continuously connected to a lower end portion of the dash lower panel 3 to extend backward in a substantially horizontal direction. A rear bulkhead 9 is provided so as to rise up slantingly from a rear portion of the floor panel 8, at a back face of an upper end portion of which there is provided a rear cowl portion 10 (rear cowl member) extending in a width direction of the vehicle. Herein, the rear bulkhead 9 is a panel member which separates the passenger compartment 2 from a rear part compartment.

Further, a rear floor 11 is provided so as to extend backward from a middle portion of the rear bulkhead 9 in a vertical direction of the vehicle. A rear air conditioning unit 12 for air-conditioning the passenger compartment 2 is provided near the rear cowl portion 10 on the rear floor 11, and a so-called trunk room 13 (a load compartment) is formed behind the rear air conditioning unit 12. As apparent from FIG. 1, the rear air conditioning unit 12 is disposed within a wheel base of the vehicle.

Further, the rear air conditioning unit 12, as illustrated in FIG. 2, comprises a blower and cooling unit 14, and a heater unit 15. The heater unit 15 is disposed at a central portion in the vehicle width direction, and the blower and cooling unit 14 is disposed at one side of the vehicle in the vehicle width direction.

Figure 3:
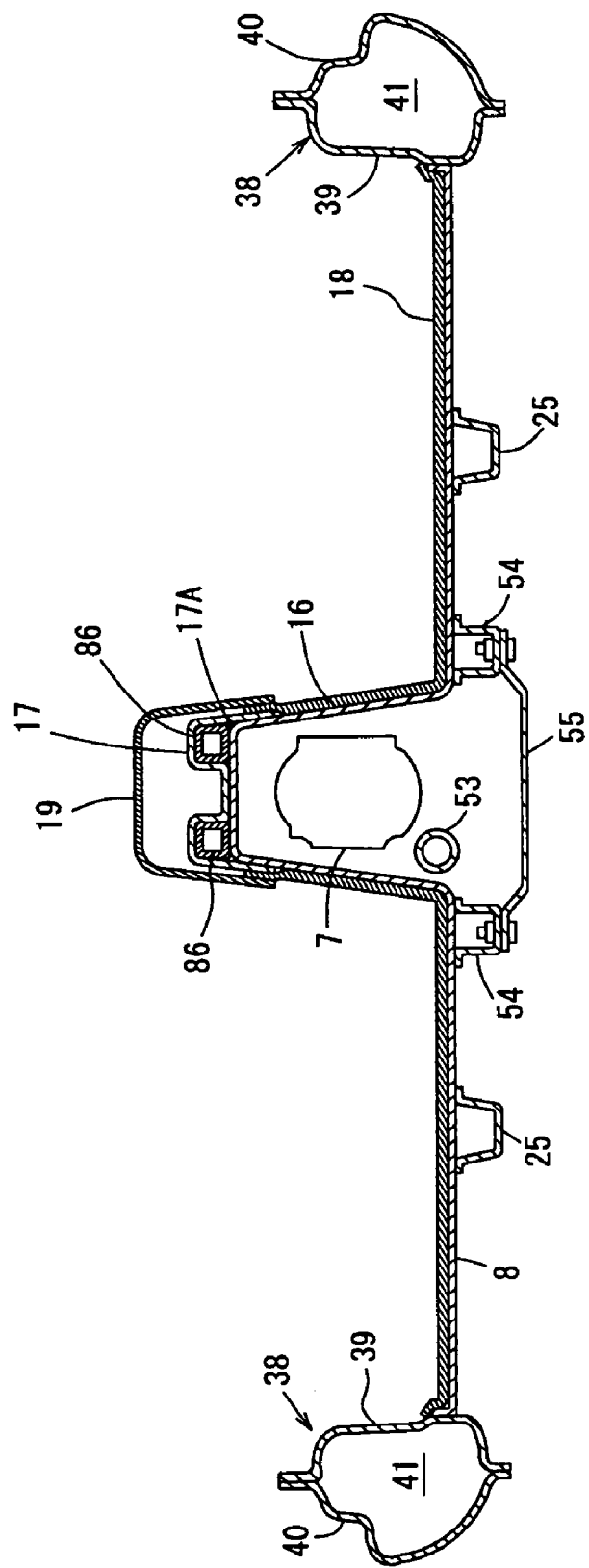
FIG. 3 is a sectional view of a major part.

At a central portion of the floor panel 8 constituting a vehicle floor continuously connected to the dash lower panel 3, as shown in FIGS. 1 and 3, there is provided a tunnel portion 16 which protrudes in the passenger compartment 2 and extends in the longitudinal direction of the vehicle. An upper tunnel member 17 (a so-called high-mount-backbone frame) is fixed on an upper portion of the tunnel portion 16 along the tunnel portion 16. The upper tunnel member 17 is connected to the dash lower panel 3 at its front end and to the rear bulkhead 9 at its rear end. Two closed cross sections 17A, 17A extending in the longitudinal direction in parallel are formed by the upper tunnel member 17 and the tunnel portion 16 as shown in FIG. 3. Thus, the upper tunnel member 17 provides a structure which can improve rigidity of vehicle floor and body.

Herein, as illustrated in FIG. 3, a floor mat 18 is put on the floor panel 8 and the tunnel portion 16, and there is provided a console 19 to cover the upper tunnel member 17 and the tunnel portion 16.

There are, as shown in FIGS. 1 and 2, provided a pair of left and right seats 22, 22 on the floor panel 8 with the above-mentioned tunnel portion 16 and upper tunnel member 17 between them, which include seat cushions 20, 20 and seat backs 21, 21 respectively. In this embodiment, the right seat 22 corresponding to the location of a steering wheel 23 constitutes a driver's seat, and the left seat 22 constitutes a passenger's seat. Of course, a left-handle vehicle may be used.

Herein, as shown in FIGS. 1 and 2, in the above-mentioned engine room 1, there are provided a pair of left and right front side frames 24, 24 (vehicle body rigidity members), rear ends of which are connected with the dash lower panel 3 and which extend forward in the longitudinal direction from the dash lower panel 3. A kick-up portion of each rear portion of the front side frames 24, 24 is provided along the dash lower panel 3, and there are provided a pair of left and right floor frames 25, 25 which are coupled to respective lower ends of the kick-up portions and extend backward along the floor panel 8.

Connecting members 26, 26 are attached to front ends of the front side frames 24, 24, and a bumper reinforcement 27 is formed to connect the both connecting members 26, 26 and extends in the vehicle width direction.

Further, there is provided a front cross member 28 interconnecting the front side frames 24, 24 and extending in the vehicle width direction. There are provided a pair of batteries 29, 29 just before a normal cross section (without a recess) of the dash lower panel 3 beside the engine 5, which are attached on the front side frames 24, 24.

The batteries 29, 29 also function to charge an electric energy generated by the ISG unit 6 therein, which are placed on conjunction portions of the front side frames 24, 24 with dash lower panel in the present embodiment. Herein, front ends of the batteries 29, 29 are so located before the engine 5 as to receive a load caused by a head-on collision of the vehicle, thereby preventing the engine 5 from moving back. Further, two batteries, not one large-sized battery, are located at the both sides of the vehicle, thereby improving a balance of weight.

Extensions 17a, 17a of the upper tunnel member 17 are connected to battery-disposed portions of the dash lower panel 3 as shown in FIG. 2 so as to convey the collision load properly to the vehicle body.

Further, as shown in FIGS. 1 and 2, a radiator 30 (heat exchanger) is disposed between the batteries 29, 29 in the engine room 1 so as to overlap with the batteries 29, 29 in the longitudinal direction of the vehicle.

Further, heavy articles such as the driving device including the engine 5 and the ISG unit 6, and auxiliary parts of the batteries 29, 29 and the radiator 30 are all disposed, as shown in FIGS. 1 and 2, within the wheel base in order to reduce yaw inertia moments thereof.

Also, as shown in FIG. 1, there is provided an air cleaner 31 including a recess portion 31a at the bottom, and an upper tank of the radiator 30 is disposed so close to the recess portion 31a that the air cleaner 31 overlaps with the radiator 30 in the vertical direction and the longitudinal direction of the vehicle, ensuring a necessary volume of the air cleaner. The air cleaner 31 is coupled to a L-shaped intake pipe 32, when viewed in a plan view, at its upstream end as shown in FIG. 2.

Herein, as illustrated in FIGS. 1 and 2, rear cross members 33, 33 extending in the vehicle width direction are disposed at rear portions of the floor frames 25, 25 which are fixed to a lower face of the floor panel 8.

A pair of left and right rear side frames 34, 34 are provided so as to extend on the lower surface of the rear floor 11 from back faces of the rear cross members 33, 33. Two rear cross members 35, 36 extending in the vehicle width direction are provided so as to be interposed between the rear side frames 34, 34 and apart from each other in the longitudinal direction. Further, a rear bumper reinforcement 37 extending in the width direction is provided at rear portions of the rear side frames 34, 34. Herein, the above-described parts 34, 35, 36 and 37 are vehicle body rigidity members.

As shown in FIGS. 2 and 3, there are provided a pair of side sills 38, 38 at both left-and-right ends of the floor panel 8, which extend in the longitudinal direction in parallel to the floor frames 25, 25. Each of the side sills 38, 38, as shown in FIG. 3, is comprised of a side sill inner 39 and a side sill outer 40 to form a vehicle-body rigidity member with a side sill closed cross section 41 extending in the longitudinal direction of the vehicle. Herein, a side sill reinforcement may be provided in the side sill closed section 41 at need.

The side sills 38, 38 are connected to lower ends of hinge pillars 42, 42 extending vertically at their front ends respectively as shown in FIG. 2. Each of the hinge pillars 42, 42 is comprised of a hinge pillar inner and a hinge pillar outer to form a vehicle-body rigidity member with a closed cross section 43 extending in the vertical direction.

There is provided a cowl upper panel 44 that is disposed above the dash lower panel 3 so as to extend in the vehicle direction as shown in FIG. 1. There is also provided an instrument panel member 45 with a closed cross section that is located backward away from a front cowl portion including the cowl upper panel 44 so as to extend in the vehicle width direction above the dash lower panel 3. The instrument panel member 45 is connected with rear portions of the hinge pillars 42, 42 at its both left-and right ends, as shown in FIG. 2. The instrument panel member 45 is the vehicle body rigidity member supporting an instrument panel 46.

Further, as shown in FIGS. 1 and 2, the above-mentioned recess portion 3*a* is formed in such manner that the central portion of the dash lower panel 3 in the vehicle width direction is recessed backward from the front cowl portion to the instrument panel member 45. Herein, the above-mentioned pair of extensions 17*a*, 17*a* are formed to be integral with the upper tunnel member 17 fixed on the tunnel portion 16, which extend forward along side faces of the recess portion 3*a* of the dash lower panel 3 to a base face (non-recessed face). A closed cross section is formed between the dash lower panel 3 and the extensions 17*a*, 17*a*.

Herein, in FIGS. 1 through 3, a reference numeral 47 denotes a front wheel, and other reference numerals denote respective pars as follows: a rear wheel 48; hood 49; a trunk lid 50; a steering rack 51; a front suspension cross member (so-called sus cross) 52; an exhaust pipe 53; a lower tunnel member 54 connected to the lower face of the floor panel 8 and extending in substantially parallel with the floor frame 25 in the longitudinal direction; a lower connecting member 55 interconnecting detachably the lower tunnel members 54, 54; and a rear differential device 56.

Next, an induction structure for inside and outside air of the air conditioner for the vehicle will be described referring to FIGS. 4 through 7. There is provided a rear package 60 extending substantially horizontally and backward from an upper end of the rear bulkhead 9, and the above-mentioned rear cowl portion 10 is located in the corner between a front portion of the rear package 60 and an upper portion of the rear bulkhead 9.

Figure 4:
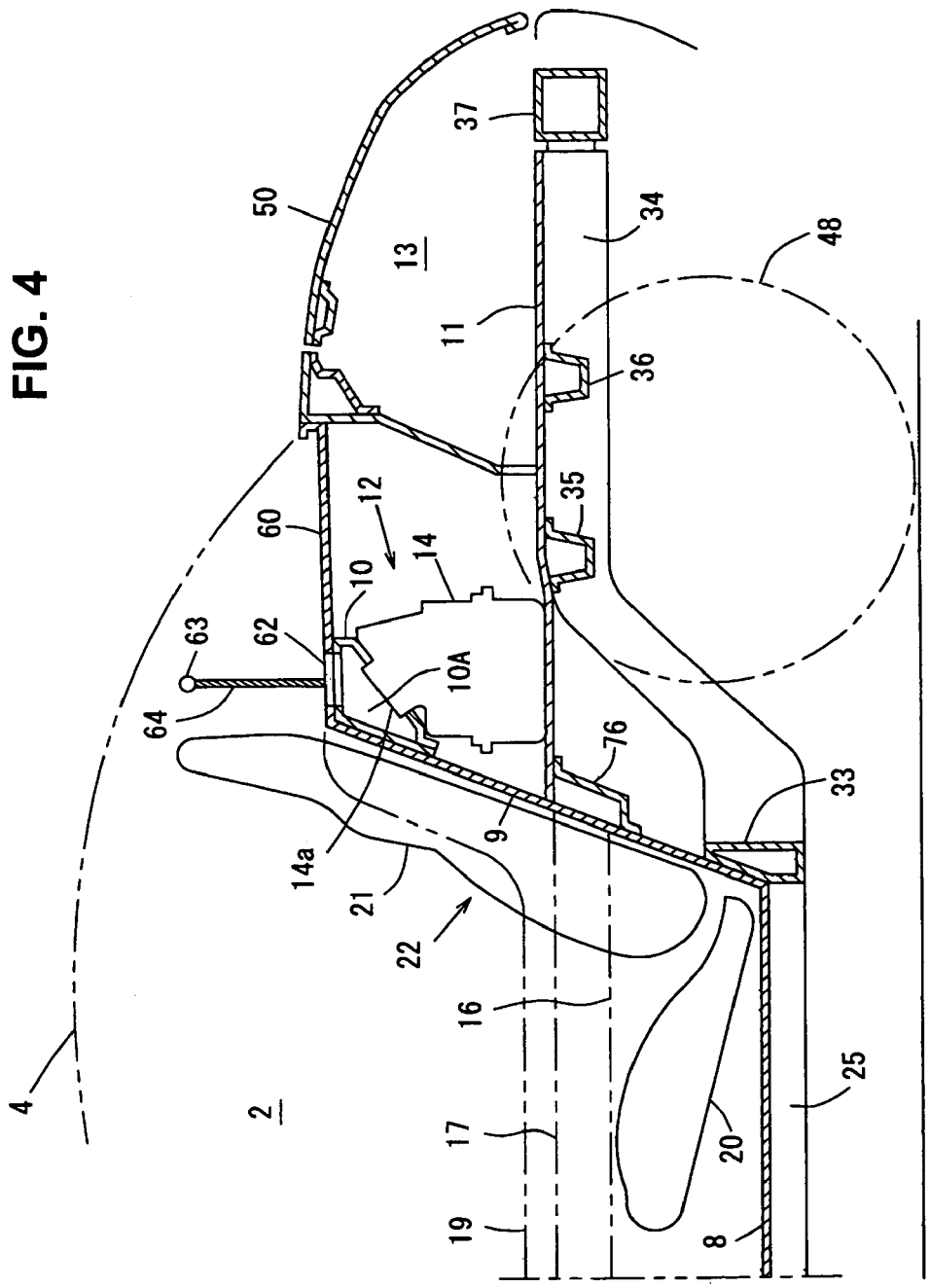
FIG. 4 is an enlarged side view of a rear part of FIG. 1.
Figure 5:
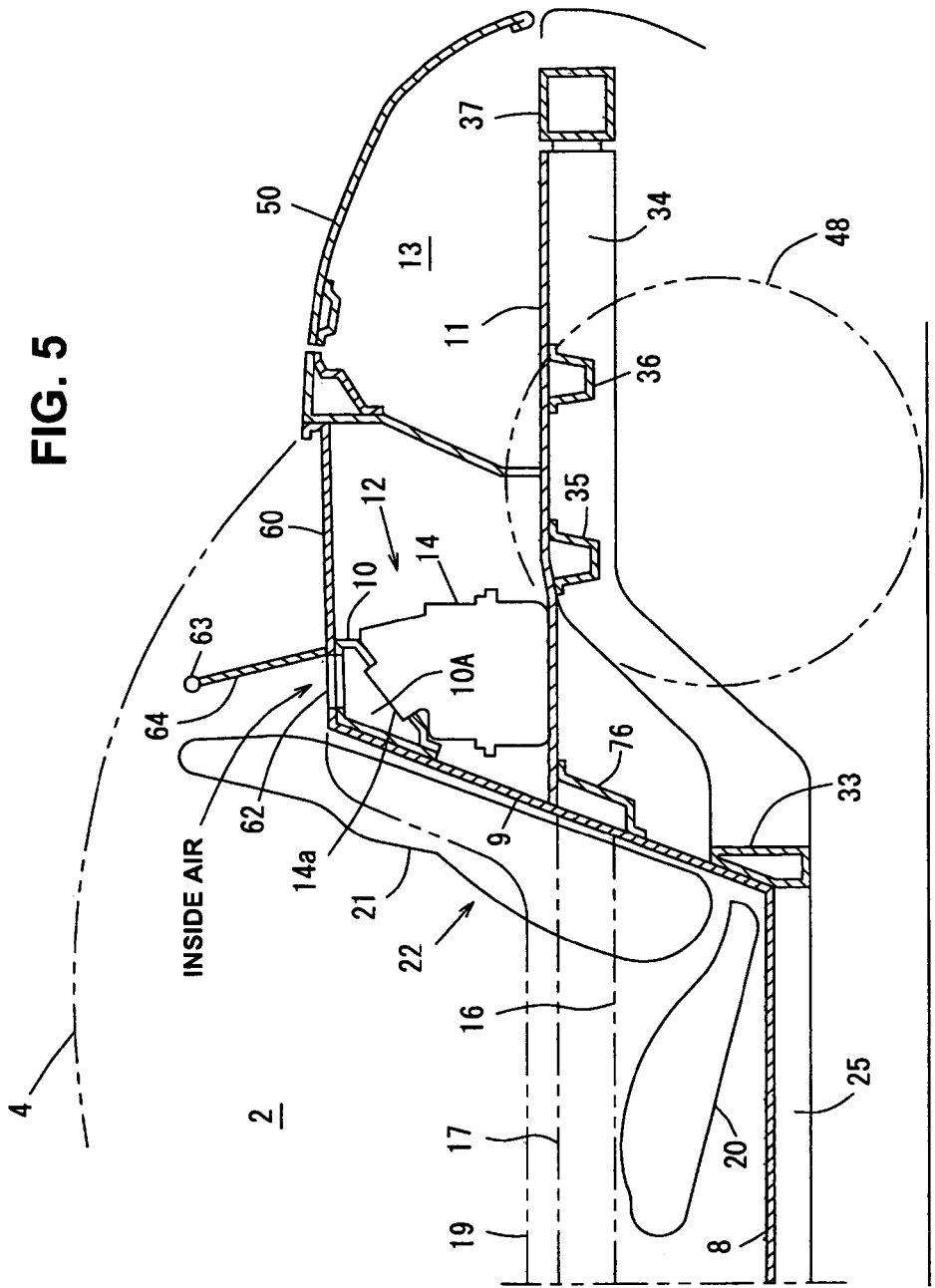
FIG. 5 is a side view showing an inside-air induction state by a positional change of an aero-board.
Figure 6:
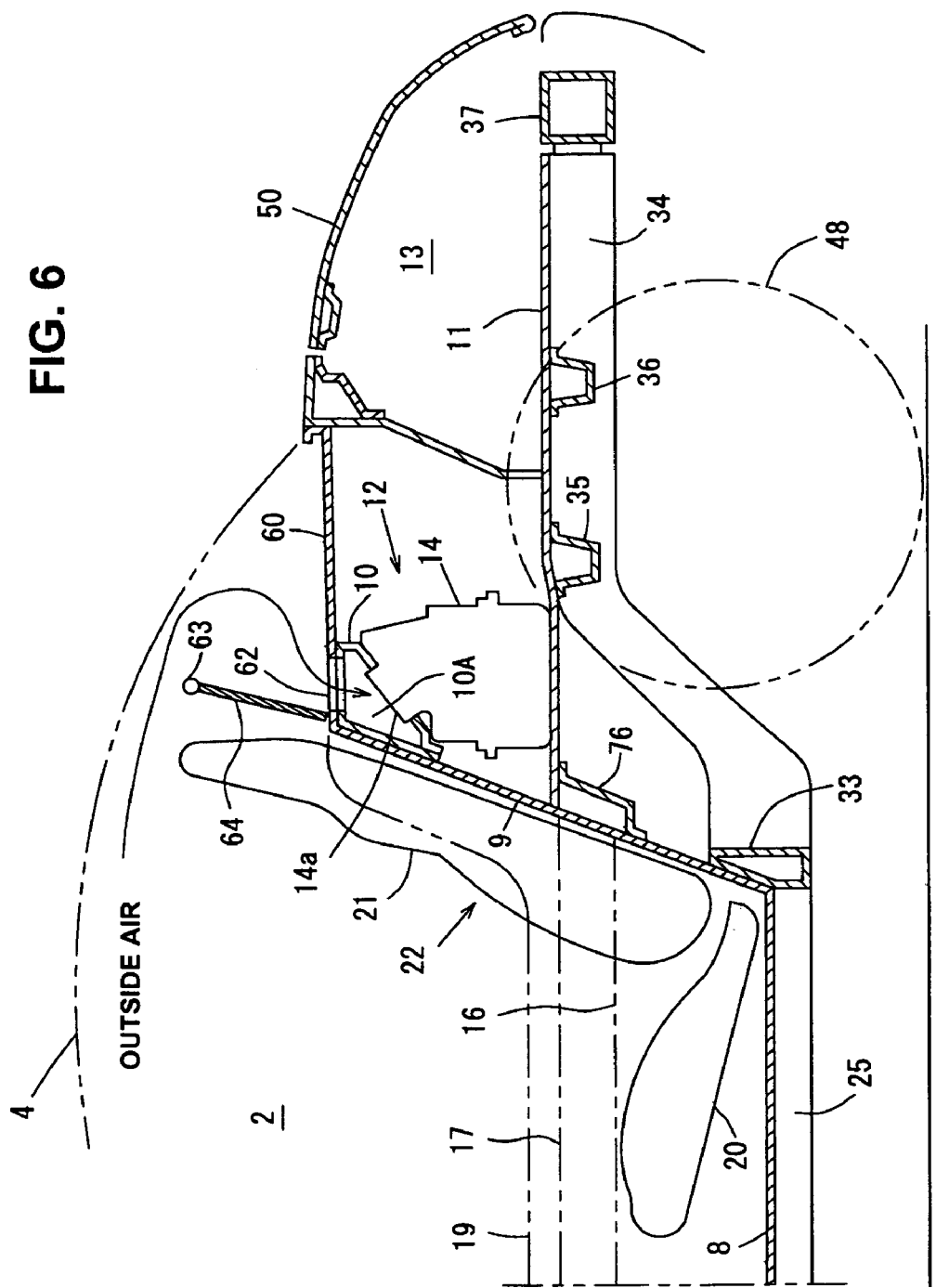
FIG. 6 is a side view showing an outside-air induction state by the positional change of the aero-board.
Figure 7:
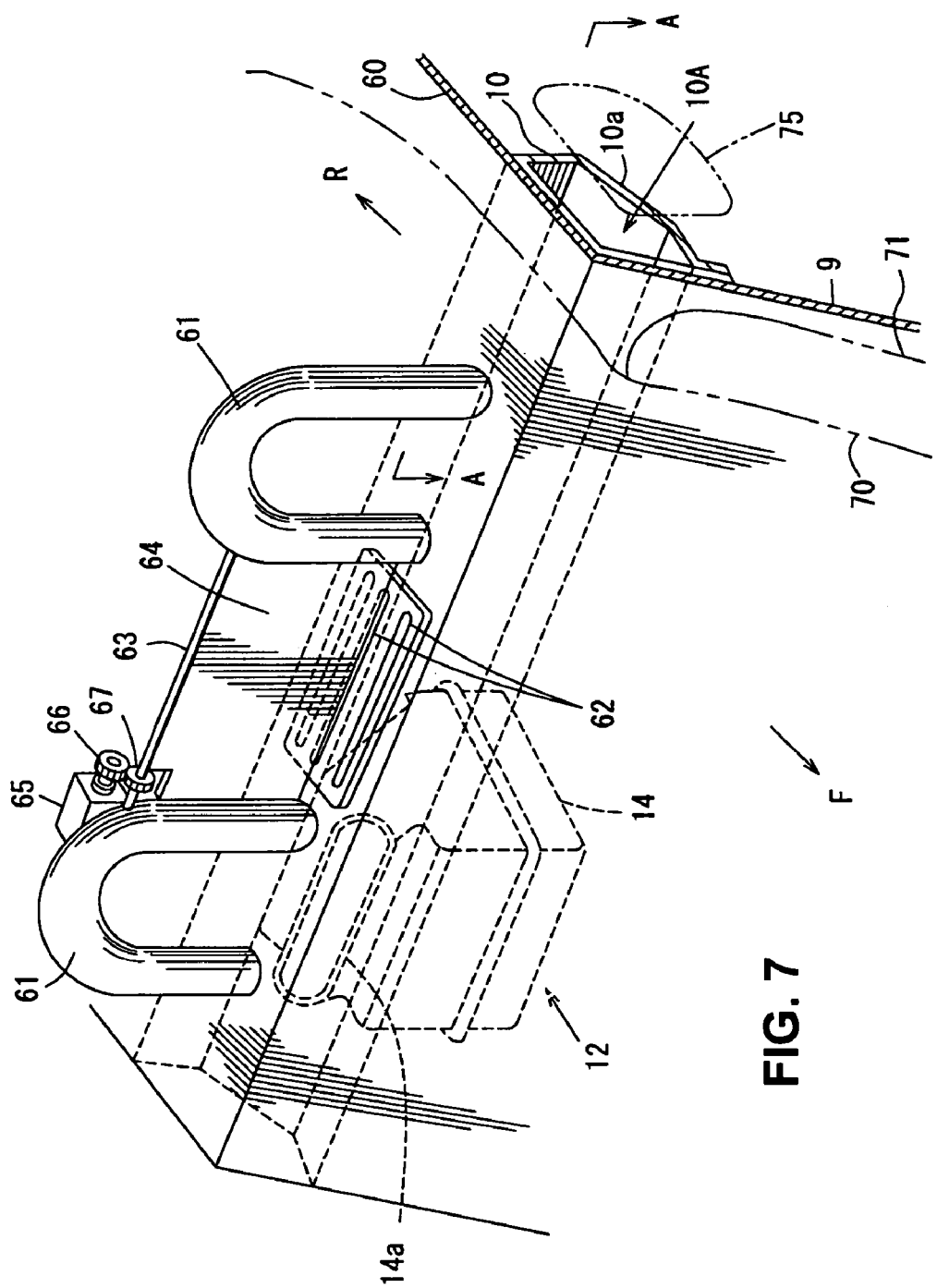
FIG. 7 is a perspective view of a major part of FIG. 4.

Further, as illustrated in FIG. 7, roll bars 61, 61 are provided on the rear package 60 so as to correspond to the left and right seats 22, 22 (in the present embodiment, the right seat 22 is a driver seat and the left seat 22 is a passenger seat) in order to protect the passengers, between which there is formed an inside-and-outside air induction port 62 which is integral with the rear package 60 and the rear cowl portion 10 as illustrated in FIGS. 4 through 6.

The above-mentioned blower and cooling unit 14 is configured to take in the inside and outside air through its intake port 14*a* via the inside-and-outside air induction port 62 and the closed cross section 10A of the rear cowl portion 10.

As shown in FIG. 7, there is provided a supporting shaft 63 on and between upper portions of the roll bars 61, 61 so as to rotate around its shaft axis. An aero-board 64 (plate member to prevent outside air from coming in during the roof open state of the open car) is attached to the supporting shaft 63, and a lower end of the aero-board 64 (plate member to prevent outside air from coming in during the roof open state in the open car) extends close to the inside-and-outside air induction port 62 formed on the rear cowl portion 10.

A rotary actuator 65, such as, for example, a DC motor, is mounted on a back face of one of the roll bars 61, 61 directly or via a bracket (not illustrated). A drive gear 66 fixed to a rotational shaft of the actuator 65 and a driven gear 67 connected with the above-mentioned supporting shaft 63 are engaged with each other all the time, and thereby the aero-board 64 is changed in its position by the actuator 65 via respective parts 66, 67, 63.

Namely, when the aero-board 64 is located in its neutral position as shown in FIG. 4, the inside-and-outside air induction port 62 takes in the inside air and the outside air. Meanwhile, when the lower end of the aero-board 64 is located backward as shown in FIG. 5, the inside-and-outside air induction port 62 takes in the inside air. Further, when the lower end of the aero-board 64 is located forward as shown in FIG. 6, the inside-and-outside air induction port 62 takes in the outside air (rolled-in wind) by use of a negative pressure occurring behind the aero-board 64. Namely, the positional change (change of its slant angle) of the aero-board 64 provides the induction switching of the inside-and-outside air.

Figure 8:
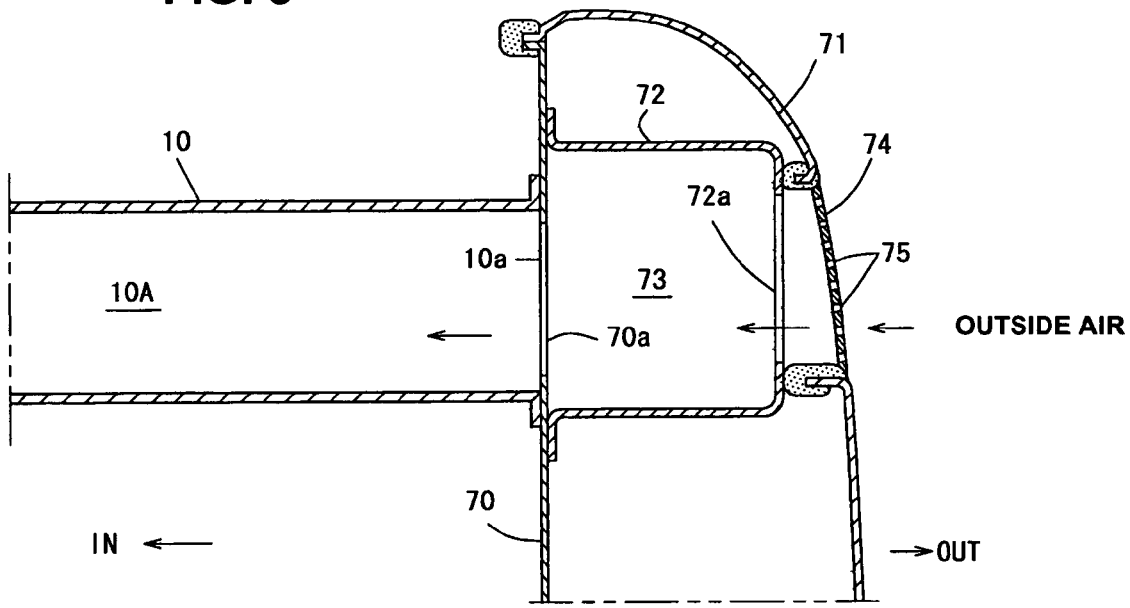
FIG. 8 is an enlarged sectional view of a major part taken along the line A—A of FIG. 7.

FIG. 8 is a sectional view of a major part taken along the line A—A of FIG. 7, in which an inner panel 70 is attached at an outside end portion of the rear cowl portion 10, and a rear fender panel 71 is provided outside the inner panel 70 which constitutes a vehicle outside wall of the vehicle body. Further, a beltline reinforcement 72 as a rigidity member is attached to an inside face of the rear fender panel 71 of the inner panel 70.

There is also provided an outside-air induction passage 73 which leads to the rear cowl portion 10 and opens to an outside of the vehicle through the rear fender panel 71 as the vehicle outside wall. This outside-air induction passage 73 is formed by connecting in the vehicle width direction an outside-air induction port 75 formed on the rear fender panel 71 with a mesh member 74 disposed its opening portion, an opening portion 72*a* of the beltline reinforcement 72, an opening portion of the inner panel 70, and an opening portion 10*a* at the side of the rear cowl portion 10 in the vehicle width direction. Here, the above-described outside-air induction passage 73 may be formed at the both sides of the intake port 14*a* of the blower and cooling unit 14. Herein, in FIGS. 4 through 6, a reference numeral 76 denotes a cross member which is formed in the corner between a lower face of a front portion of the rear floor 11 and a back face of a middle portion of the rear bulkhead 9. A cross section is formed by these parts 11, 9 and 76 so as to extend in the vehicle width direction.

Figure 9:
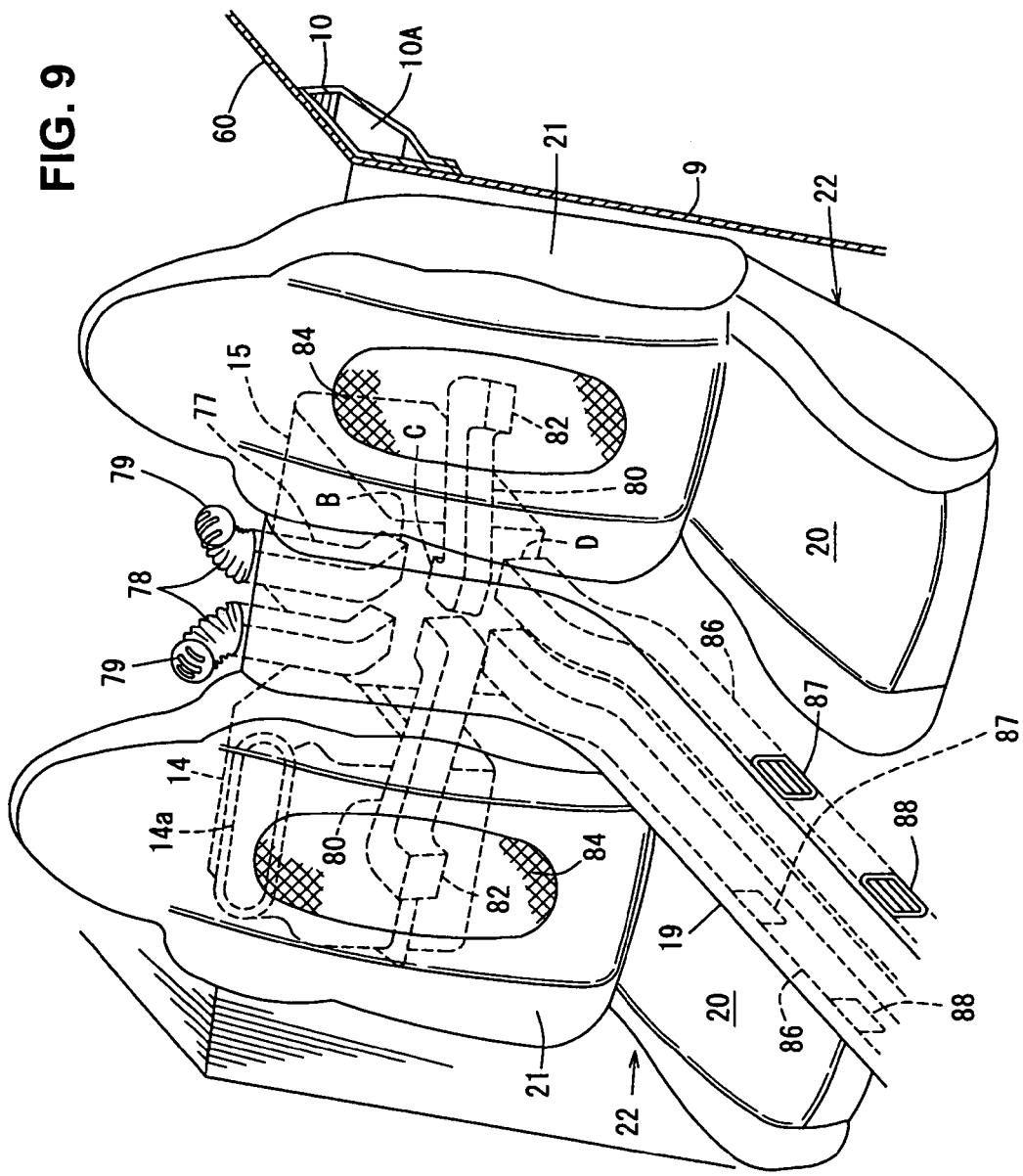
FIG. 9 is a perspective view showing a layout of ducts.
Figure 10:
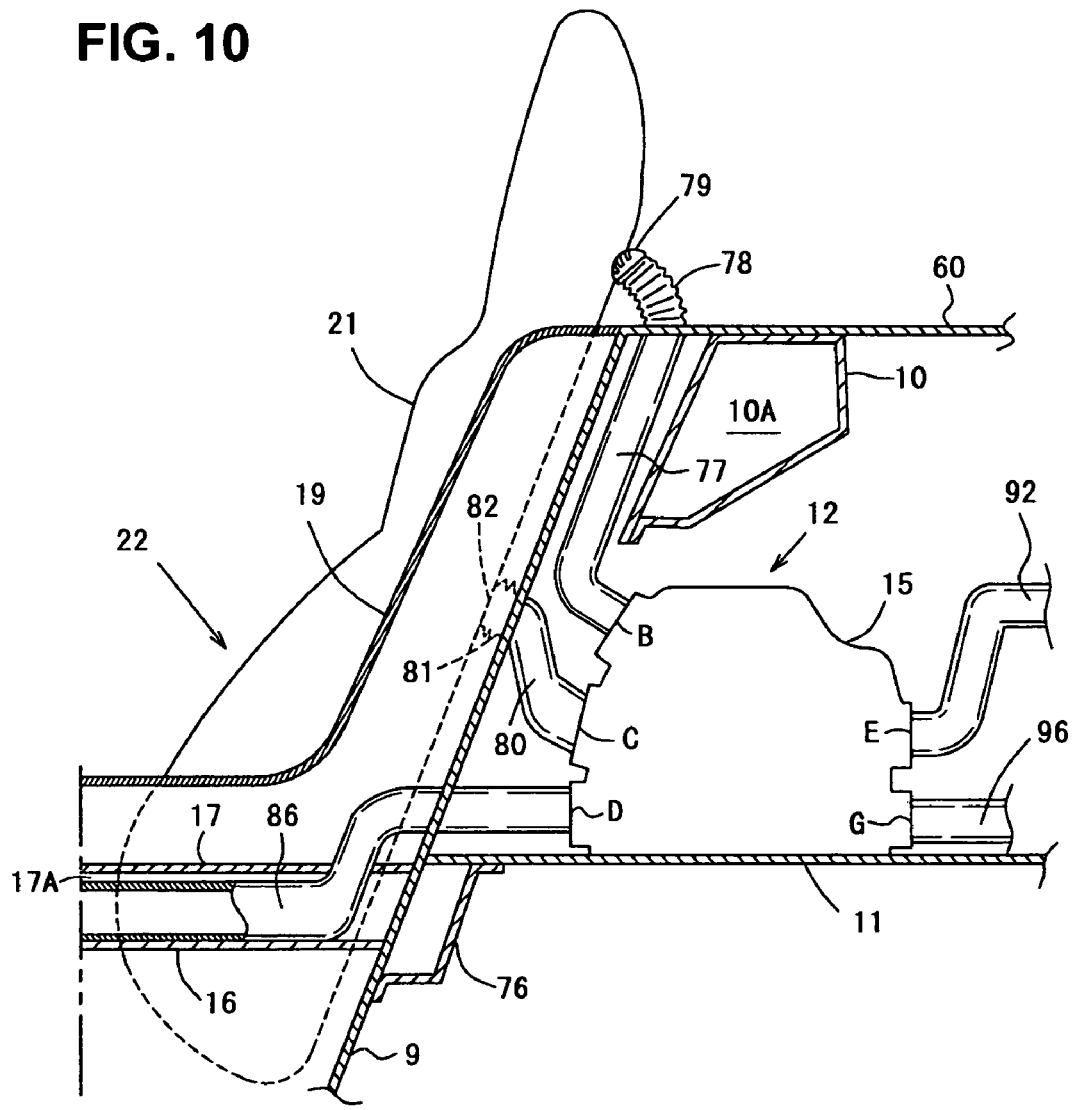
FIG. 10 is a side view of a major part of FIG. 9.

Next, a blowoff passage for conditioned air (warm air) such as cooling air from the heater unit 15 will be described referring to FIGS. 2, 9 and 10. The heater unit 15 comprises a pair of blowoff portions B, C, D, E, and G as illustrated in FIGS. 9 and 10. The blowoff ports B, C, and D are formed as a pair so as to correspond to the driver seat and the passenger seat. Meanwhile, the passenger seats 22, 22 (particularly, the seat backs 21, 21) are disposed before and close to the rear bulkhead 9.

A duct 77 as an air supplying duct is coupled to the blowoff portion B of the heater unit 15, and a blowoff port 79 is formed at a front end of a bellows portion 78 disposed at an upper end of the duct 77 extending upward. Thereby, this blowoff port 79 is located inboard of the rear bulkhead 9 so that the conditioned air from the rear air conditioning unit 12 is directed to the neck portion of the passenger. The above-mentioned bellows member 78 allows the position and direction of the blowoff port 79 to be adjustable according to needs or physical features of passengers.

Further, a duct 80 as an air supplying duct is coupled to the blowoff portion C of the heater unit 15, and a blowoff port 82 is formed at a front end of a bellows portion 81 disposed at an upper end of the duct 80 extending upward slightly. Thereby, this blowoff port 82 is attached to each seat back 21 of the driver seat 22 and the passenger seat 22 so that the conditioned air from the rear air conditioning unit 12 is directed to the back portion and/or the lumber portion of each vehicle passenger sitting on the seat 22. The above-mentioned bellows member 78 allows the position and direction of the blowoff port 79 to be adjustable according to needs or physical features of passengers.

Figure 11:
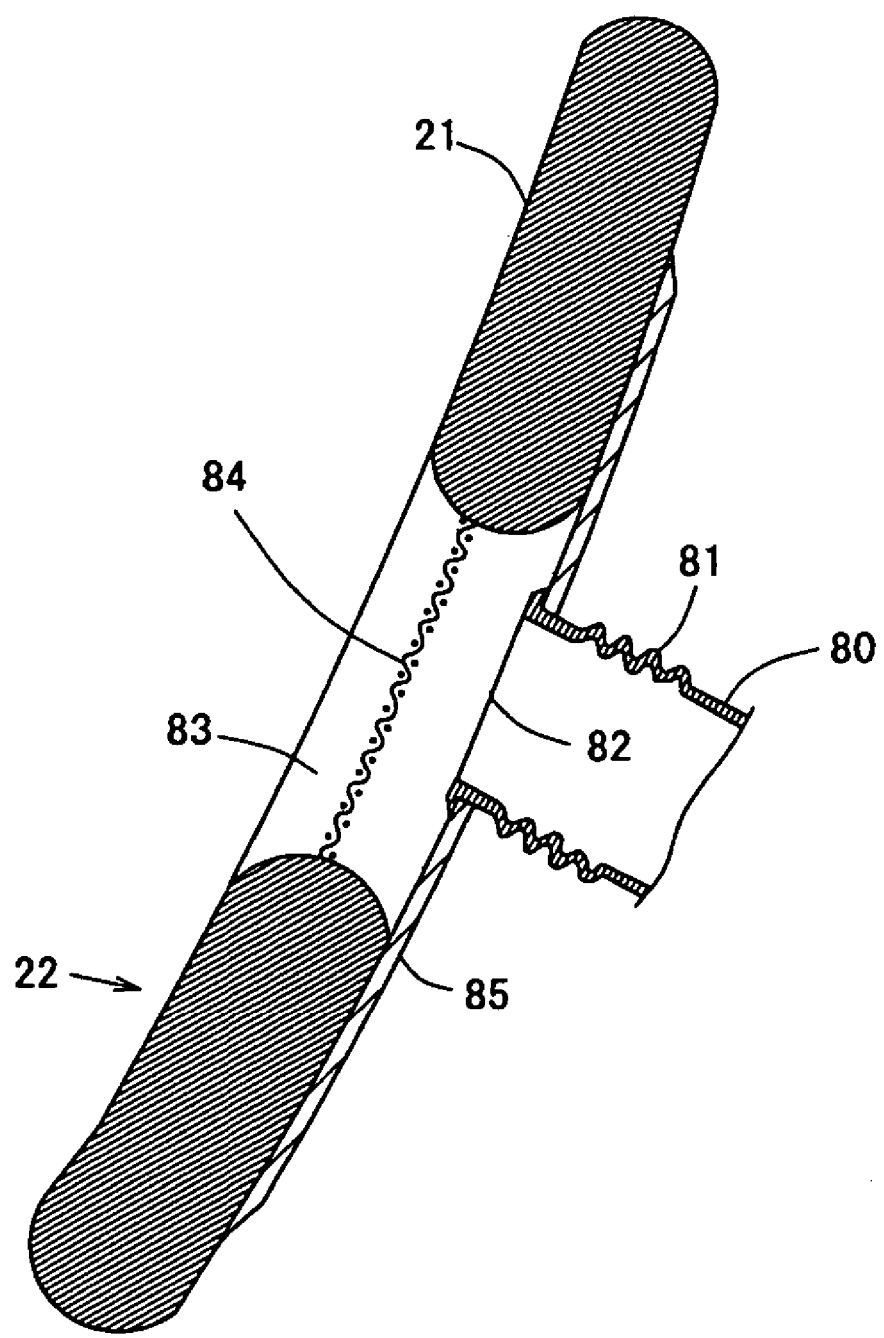
FIG. 11 is a sectional view showing a relationship between a seat back and a duct.

As shown in FIG. 11, a through hole 83 is formed at the middle portion of the seat back 21 so as to penetrate through the seat back, and a net member 84 (mesh member) is disposed at the middle portion of the through hole 83 in the longitudinal direction of the vehicle so as to cover a whole part of the through hole 83.

Also, an edge (upper end periphery of the duct 80 upstream of the bellows portion 81) of the blowoff port 82 is attached to a back face portion of the seat back 21 via an attaching member 85. Thereby, even when the passenger leans against the seat back 21, the blowoff port 82 is prevented from being closed. Accordingly, the conditioned air can be properly provided to the back portion and/or lumber potion of the passenger, and there is provided a structure which accommodates a forward and backward slide of the seat 22 and a reclining of the seat back 21 by means of the bellows portion 81. Herein, although the number of holds of the bellows portion 81 is illustrated schematically in drawings, it can be so provided as to correspond to the seat sliding and the seat reclining. Also, although only one of seats 22 is shown in FIG. 11, the blowoff ports for the back portions of passengers are formed similarly for the both driver seat and passenger seat.

Further, as shown in FIGS. 9 and 10, a duct 86 as an air supplying duct is coupled to the blowoff port D of the heater unit 15, which is led into the closed cross section 17A formed by the upper tunnel member 17 and the tunnel portion 16 extending forward from the lower portion of the rear bulkhead 9 so as to extend forward. There are also provided a blowoff port 87 which blows off the conditioned air from the rear air conditioning unit 12 toward the thigh of the passenger and a blowoff port 88 which blows off the one toward a foot portion of the passenger as well. The blowoff ports 87, 88 are communicatively coupled to the duct 86 in the crossed cross section 17A via the console 19 and the upper tunnel member 17, and there are provided movable louvers at the respective blowoff ports 87, 88.

Figure 12:
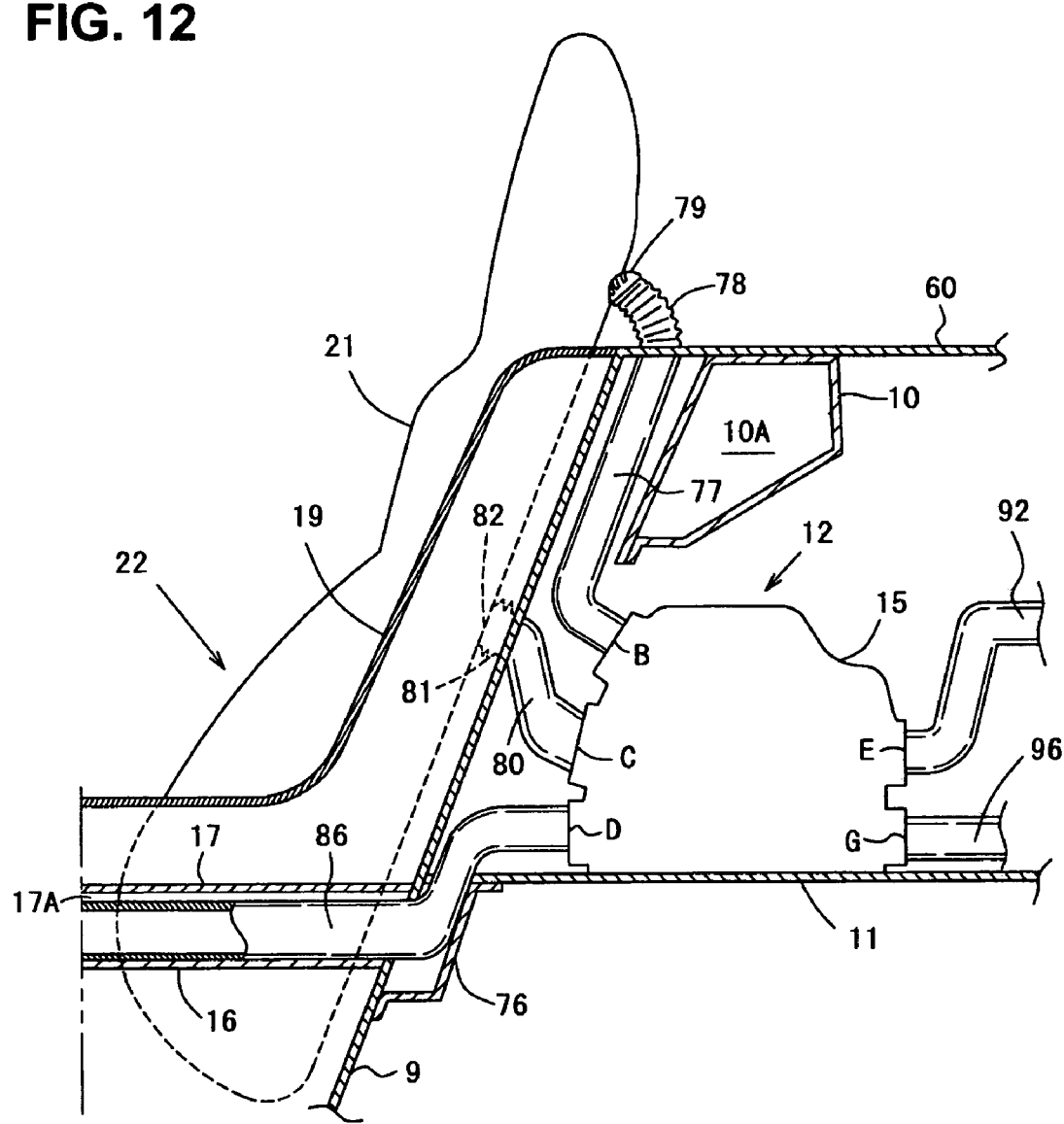
FIG. 12 is a side view showing another embodiment of a layout of ducts.

Herein, the duct 86 may be led into the closed cross section 17A via an opening of the rear bulkhead 9 and an opening of the upper tunnel member 17 as shown in FIG. 10, or as shown in FIG. 12, it may be led into the closed cross section 17A via an opening of the rear floor 11, the closed cross section of the cross member 76 and an opening of the rear bulkhead 9.

Figure 13:
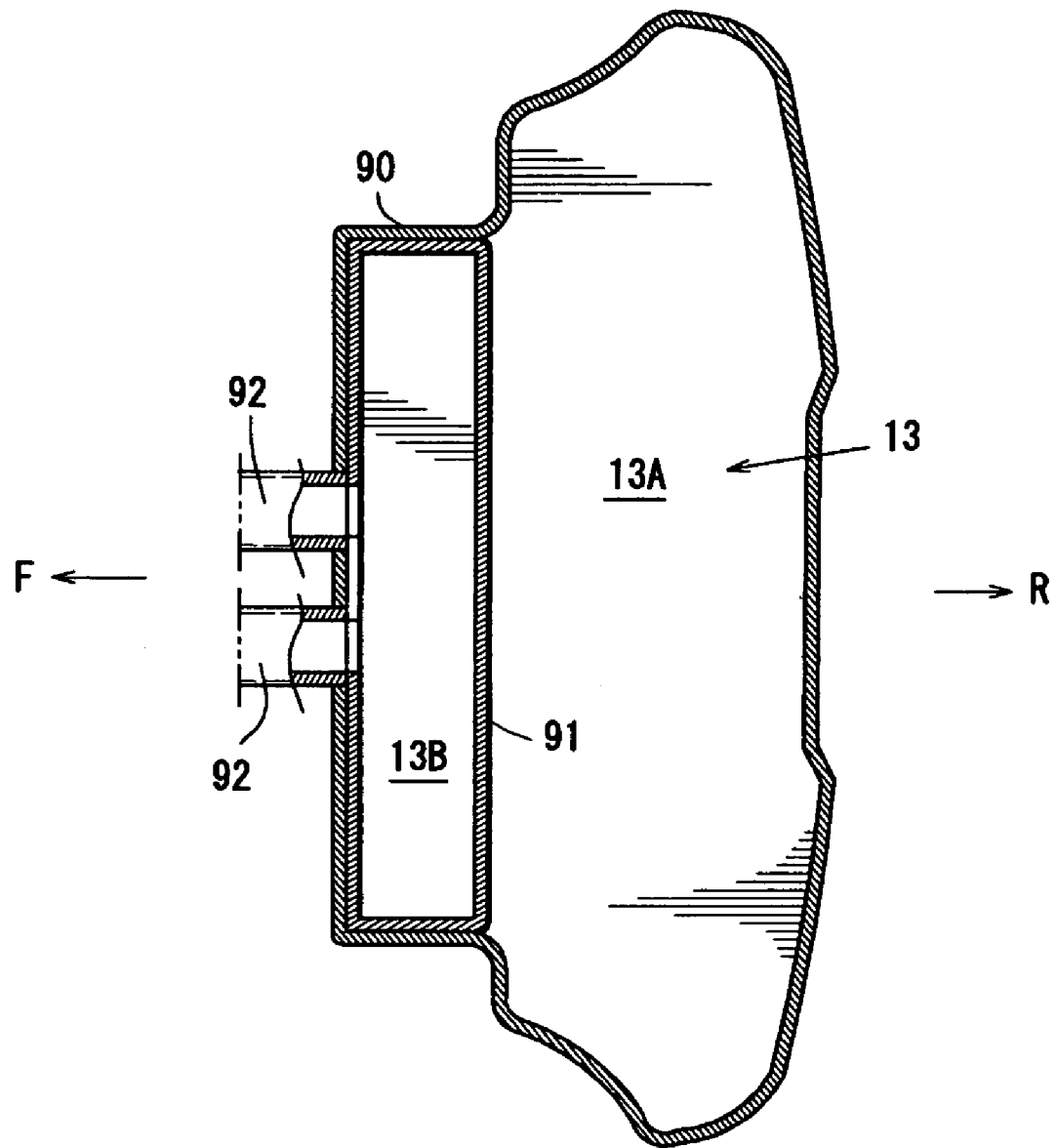
FIG. 13 is a plan view of a trunk room in which plural load compartments are partitioned.

The trunk room 13 enclosed by a trunk trim 90, as illustrated in FIG. 13, is divided into plural luggage compartments 13A, 13B, and a smaller load compartment 13B is designed as a cooler box 91. An upper opening of the cooler box 91 is covered by a cooler box lid capable of opening the box 91 (not illustrated).

As shown in FIGS. 10, 12 and 13, a pair of ducts 92, 92 as a cooling air supplying duct to introduce a cool air into the load compartment 13B are coupled to another blowoff port E of the heater unit 15 as shown in FIGS. 10 and 12. Accordingly, the load compartment 13B serves as the cooler box 91.

Figure 14:
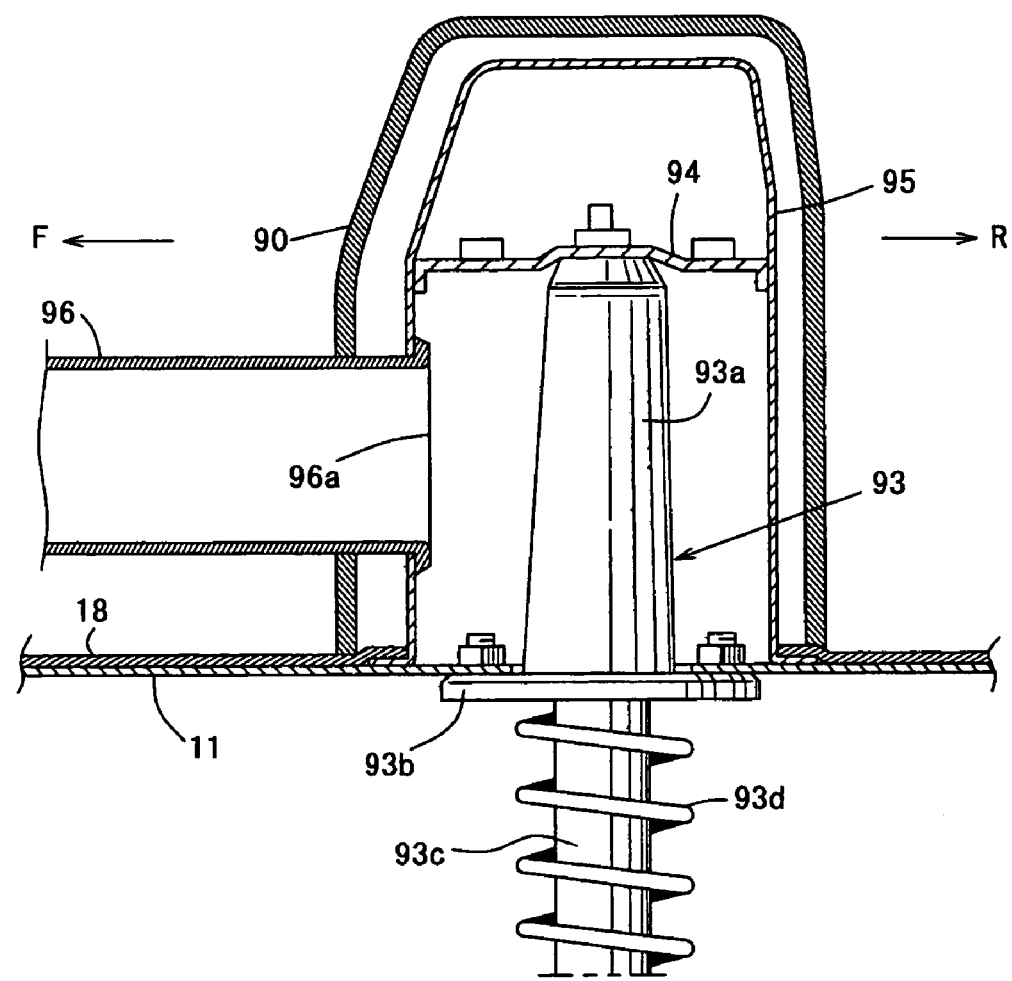
FIG. 14 is a sectional view showing a relationship between a suspension damper and a duct.

Herein, there is disposed a suspension damper 93 for supporting the rear wheel 48 of the vehicle near the trunk room 13 as illustrated in FIGS. 2 and 14. The suspension damper 93 comprises a damper support 93a, an upper spring seat 93b, a strut 93c, a coil spring 93d and so on. The upper spring seat 93b is supported by the rear floor 11 or a suspension housing (not illustrated), and an upper end portion of the damper support 93a is supported on a suspension tower 95 via a bracket 94. The suspension damper 93 includes oil and rubber members therein.

Also, a pair of ducts 96, 96 are coupled to another blowoff port G of the heater unit 15 illustrated in FIGS. 10 and 12, which constitutes a cooling air passage to lead the cooling air from the air conditioning unit 12 to the left and right suspension dampers 93, 93, as shown in FIGS. 2, 10, 12 and 14. Accordingly, the respective suspension dampers 93, 93 can be cooled by the cooling air from the rear air conditioning unit 12.

In this embodiment, a front end opening portion 96a of each of the above-mentioned ducts 96, 96 is connected to the suspension tower 95 via the trunk trim 90 as shown in FIGS. 2 and 14. Accordingly, the suspension damper 93, particularly the oil and rubber members therein are cooled through an inside space of the suspension tower 95, thereby preventing durability of the suspension damper 93 from deteriorating and functions of the damper from changing due to a heat.

While the vehicle remains parked outside in the daytime, the temperature of an atmosphere around the suspension damper 93 increases to a high one at which the durability of the suspension damper 93 deteriorates or the damper function changes due to the heat. However, these problems can be solved by cooling the suspension damper 93 by the cooling air from the duct 96 as the damper cooling air passage.

Figure 15:
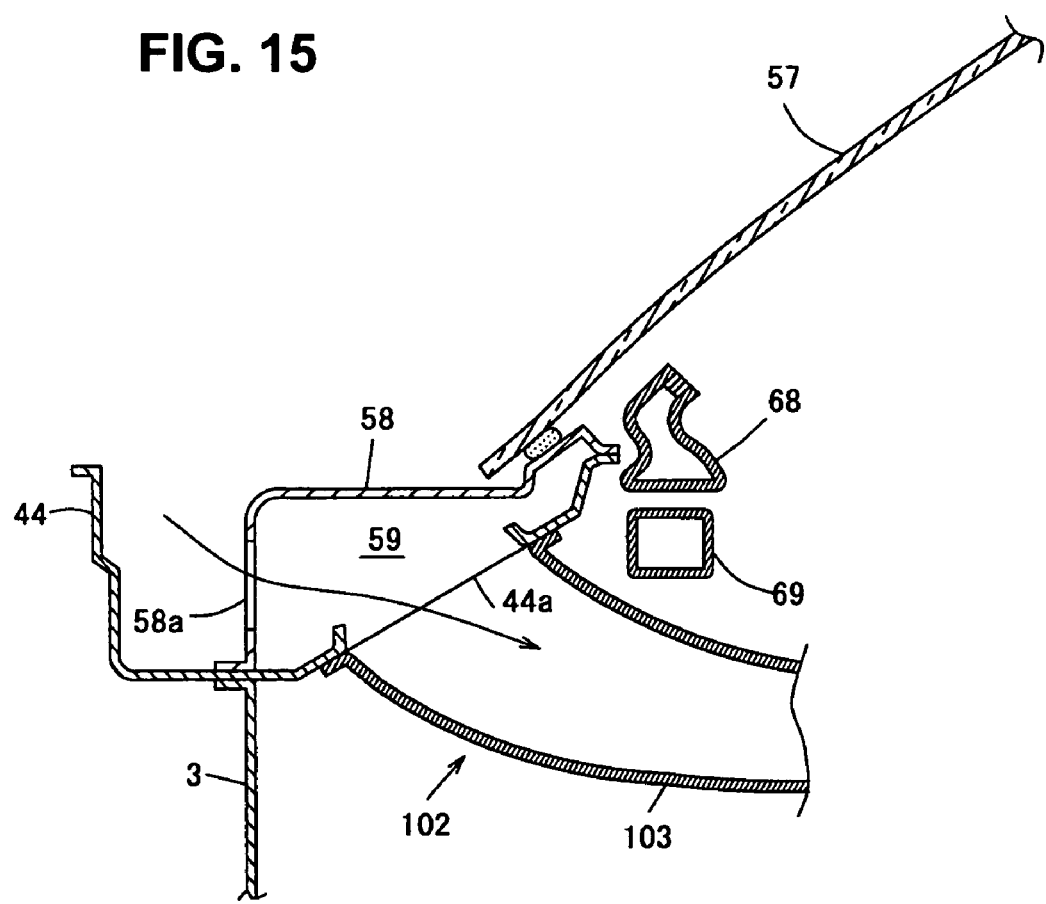
FIG. 15 is a plan view of another embodiment of load compartment partition.

As shown in FIG. 15, the cowl upper panel 44 disposed above the dash lower panel 3 is coupled to a front cowl panel 58 to support a front end of a windshield 57 (including a reinforced plastic glass).

The front cowl upper panel 58 includes a substantially L-shaped cross section and extends in the vehicle width direction, and a cowl closed cross section 59 is formed between the front cowl panel 58 and the cowl upper panel 44.

There are provided opening portions 58a, 44a for the front natural ventilation which are formed at a vertical portion of the above-mentioned front cowl panel 58 and the cowl upper panel 44 respectively which correspond to the cowl closed cross section 59.

Figure 16:
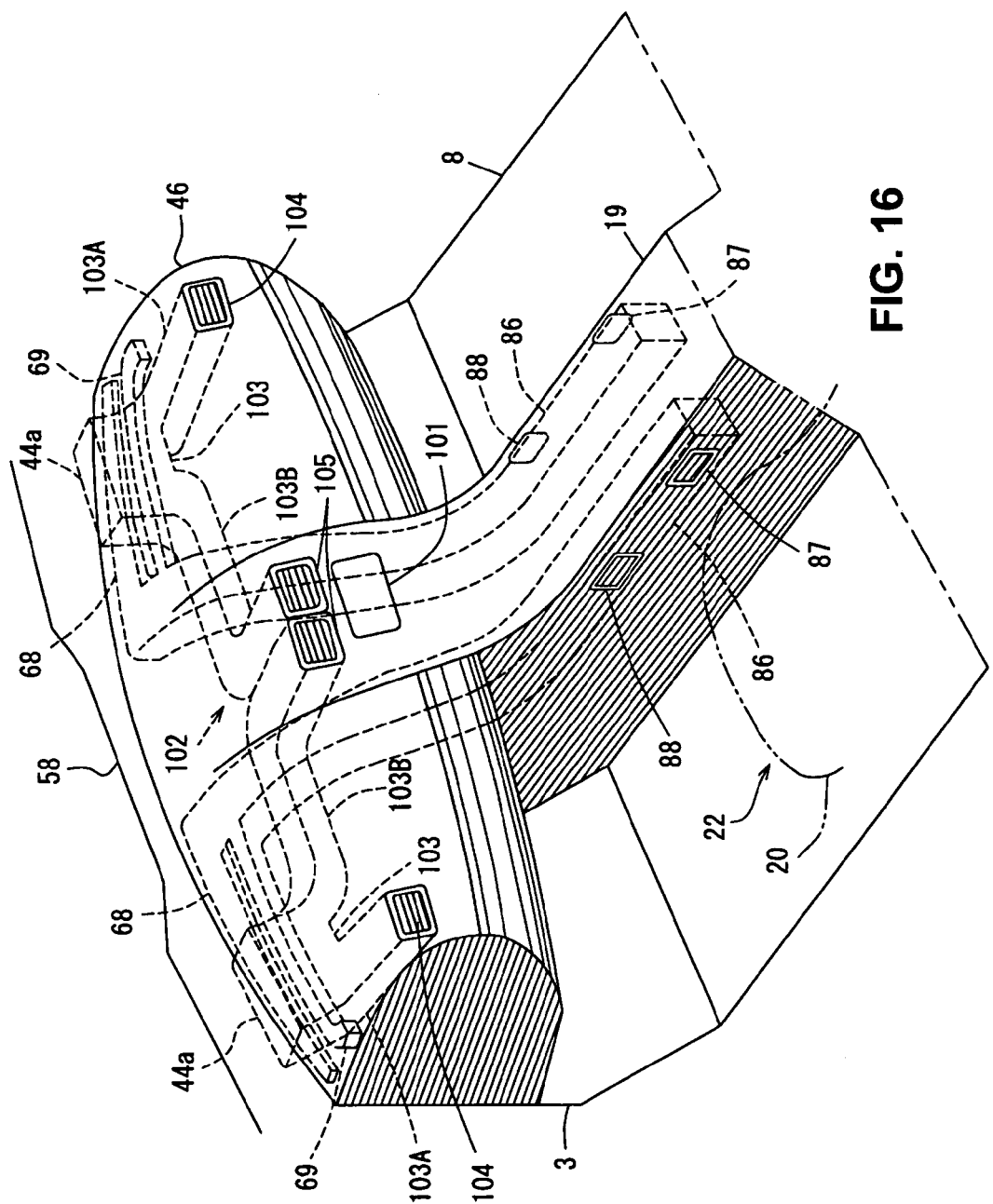
FIG. 16 is a perspective view showing a layout of a defroster.

Meanwhile, the pair of ducts 86, 86 illustrated in FIGS. 3 and 9 extend forward in the closed cross section 17A, 17A between the tunnel portion 16 and the upper tunnel member 17 to a portion near a slant lower end of the windshield 57 in the instrument panel 46 as illustrated in FIG. 16. Front ends of these extended ducts are connected to a pair of left-and-right front defroster ducts 86, 86 and a pair of left-and-right side defroster ducts 68, 69 to provide a constitution of an anti-blur of the windshield. Herein, the ducts 68, 69 are formed so as to extend in the vehicle width direction from the forward-extended portion of the pair of ducts 86, 86.

Further, as illustrated in FIG. 16, there is provided a front natural ventilation unit 102 which is disposed in the instrument panel 46 before the passenger compartment to take in the outside air and blow off the outside air into the passenger compartment 2.

The front natural ventilation unit 102 comprises bifurcated and symmetrical ducts 103, 103 which are coupled to the above-mentioned opening portions 44a, 44a illustrated in FIG. 15. Each side duct 103A constituting one of the ducts 103, 103 is provided with a side vent blowoff port 104 which is located at a side end of the instrument panel 46. Each center duct 103B constituting the other of the ducts 103, 103 is provided with a center vent blowoff port 105 which is located at the center of the instrument panel 46. These blowoff ports 104, 104, 105, 105 are formed on an outer surface of the instrument panel 46.

Namely, as illustrated by an arrow in FIG. 15, the outside air is taken in from the opening portion 58a of the front cowl panel 58, the cowl closed cross section 59, and the opening portion 44a of the cowl upper panel 44 into the pair of ducts for the natural ventilation, and the outside air is blown off into the passenger compartment 2 via the pair of side vent blowoff ports 104, 104 and the center vent blowoff ports 105, 105.

Figure 17:
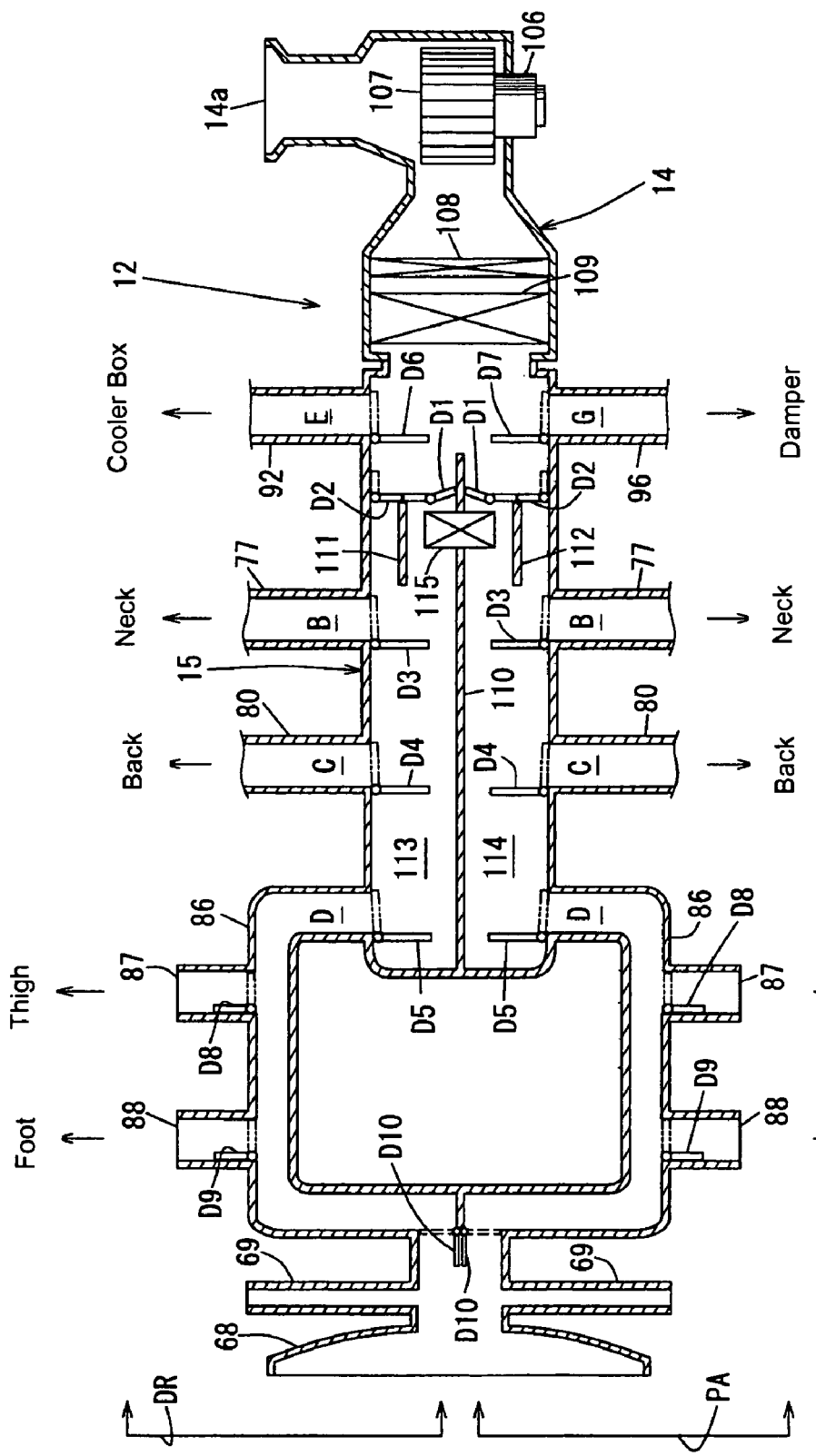
FIG. 17 is a sectional view showing a whole structure of the air conditioner for a vehicle.

FIG. 17 is a sectional view showing an entire structure of the air conditioner for a vehicle schematically. The blower and cooling unit 14 of the rear air conditioning unit 12 includes a blower 107 driven by a blower motor 106, a filter 108 provided downstream of the blower motor 107 and an evaporator 109.

Further, the inside of the heater unit 15 of the rear air conditioning unit 12 is partitioned into an area 113 for the driver seat side DR and an area 114 for the passenger seat side PA by portioning members 110, 111, and 112 except part of upstream side thereof corresponding to the blowoff ports E and G. Also, there is provided upstream of the partitioning member 110 a heater core 115 which is common to the respective area 113 and 114, and there are provided two air mix doors D1 and D2 for the respective area 113 and 114 respectively.

There are provided respectively at the above-described blowoff ports B, C, D, E and G doors for neck D3, doors for back D4, doors for tunnel D5, doors for trunk room D6, and doors for damper D7 which are operative to be opened and closed respectively. The doors D3 through D5 thereof are provided for each of the area 113 and 114 so as to control for the driver seat side DR and the passenger seat side PA separately (independently).

Further, there are provided doors for thigh D8 and doors for foot D9 which are operative to be opened and closed respectively at the inside of the thigh blowoff ports 87 and the foot blowoff ports 88 which are formed for the driver seat side DR and the passenger seat side PA in the tunnel portion 16.

Further, there are provided defroster doors D10, D10 which are operative to be opened and closed upstream of the front defroster duct 68 and the side defroster ducts 69, corresponding to the driver seat side DR and the passenger seat side PA.

The above-described elements 106, 107, D1–D10 shown in FIG. 17 are controlled by an air conditioning control device 100 (see FIG. 19) which is operative to adjust respective characteristics of conditioned air for the driver seat side DR and the passenger seat side PA separately (independently). Since the air conditioning control device 100 includes adjusting operating means 101 (see FIG. 18), first a constitution of the adjusting operating means 101 will be described in detail referring to FIGS. 16 and 18.

The adjusting operating means 101 is provided at a center console portion near the center vent blowoff ports 105 as shown in FIG. 16. Although FIG. 16 shows the embodiment in which the adjusting operating means 101 is located below the center vent blowoff ports 105, it may be located at the instrument panel 46 above the center vent blowoff ports 105.

Figure 18:
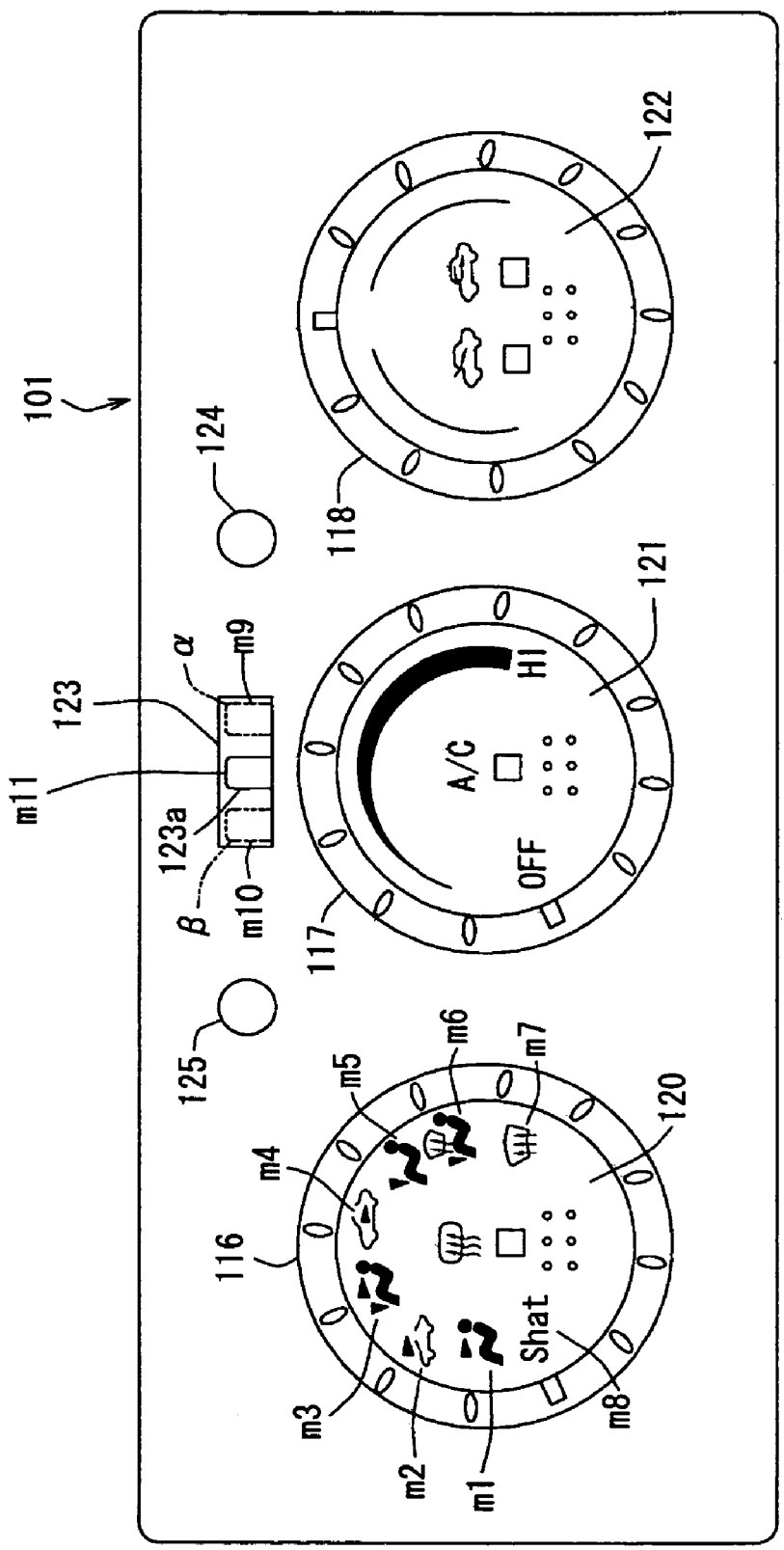
FIG. 18 is an explanatory diagram of air conditioning adjusting operating means.
Figure 19:
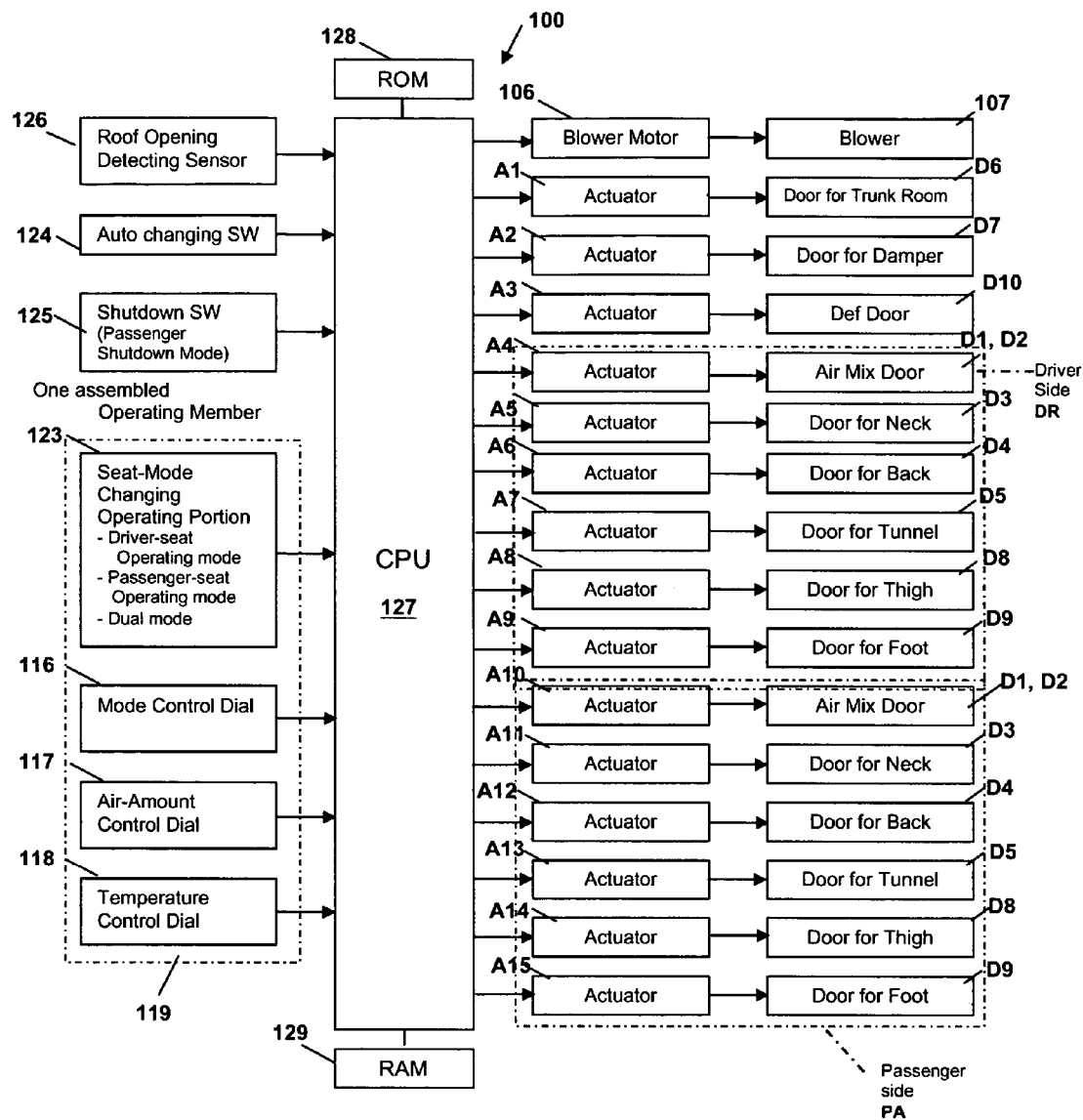
FIG. 19 is a block diagram of a control circuit showing the air conditioning control device.

As shown in FIG. 18, the adjusting operating means 101 includes a mode control dial 116 as a mode changing operating portion, an air-amount control dial 117 as an air-amount changing operating portion, and a temperature control dial 118 as a temperature adjusting operating portion, and these dials 116, 117 and 118 constitute one assembled operating member 119 (see FIG. 19).

As shown in FIG. 18, there is provided a push-button and ON-OFF type of rear defogger switch 120 inside of the mode control dial 116. A dial operation of the mode control dial 116 selectively changes air conditioning modes to a vent mode m1 (the vent mode in the present embodiment is a mode for blowing off the conditioned air mainly toward the neck of passenger, not toward a face of passenger), a roof open vent mode m2, a bi-level mode m3, a roof open mode m4, a foot mode m5, a def/foot mote m6, a deaf mode m7, or a shut mode m8.

Also, there is provided a push-button and ON-OFF type of air conditioning switch 121 inside of the air-amount control dial 117. A dial operation of the air-amount control dial 117 adjusts the air amount of conditioned air to be blown off.

Also, there is provided a push-button type of intake switch 122 to change between an outside-air intake and an inside-air circulation inside of the temperature control dial 118. A dial operation of the temperature control dial 118 adjusts the temperature of air conditioning.

Herein, the position of the aero board 64 is changed as shown in FIG. 5 by selecting the inside-air circulation by the intake switch 122, whereas it is changed as in FIG. 6 by selecting the outside-air intake by the intake switch 122.

Further, as shown in FIG. 18, the adjusting operating means 101 includes a seat-mode changing operating portion 123 which changes the mode control dial 116 and the temperature control dial 118 between a driver-seat operating mode and a passenger-seat operating mode.

The seat-mode changing operating portion 123 comprises a single slide switch. When a slide portion 123a of the switch is shifted to the right as shown by a dot line α in FIG. 18, a driver-seat operating mode m9 to adjust the air conditioning characteristics for the driver-seat side DR is selected. When the slide portion 123a of the switch is shifted to the left as shown by a dot line β in FIG. 18, a passenger-seat operating mode m10 to adjust the air conditioning characteristics for the passenger-seat side PA is selected. When the slide portion 123a of the switch is shifted to the center as shown by a solid line in FIG. 18, a dual mode m11 to adjust both air conditioning characteristics for the driver-seat side DR and the passenger-seat side together to an identical characteristics is selected.

Herein, when the passenger-seat operating mode is selected by shifting the slide portion 123a to left as shown by a dot line β in FIG. 18, the selection of the def mode m7 and the def/foot mode m6 for the passenger-seat side PA is made to be impossible.

Further, the above-described adjusting operating means 101 includes an auto changing switch 124 and a passenger-seat shutdown switch 125. The auto changing switch 124 is configured such that, with its ON operation, the separate adjusting of the driver seat and the passenger seat is available when the roof 4 is detected to be open by a roof opening detecting switch 126 (see FIG. 19) which will be described below, whereas the adjusting at the dual mode m11 is available when the roof 4 is detected to be closed. Further, the passenger-seat shutdown switch 125 is configured so as to provide a passenger-seat shutdown mode to stop (prohibit) the air conditioning control for the passenger-seat side PA when it is turned ON.

FIG. 19 is a block diagram of a control circuit of the air conditioning control device 100, and there is provided the roof opening detecting sensor 126 (vehicle roof opening detecting means) to detect an opening state of the roof 4.

A CPU 127 as a control portion drives the blower 107 by the blower motor 106 based on program stored in a ROM 128 according to inputs of the roof opening detecting sensor 126, auto changing switch 124, passenger-seat shutdown switch 125, seat-mode changing operating portion 123, mode control dial 116, air-amount control dial 117, and temperature control dial 118. Further, it drives the door for trunk room D6, door for damper D7, def doors D10, air mix doors D1, D2, doors for neck D3, doors for back D4, doors for tunnel D5, doors for thigh D8 and doors for foot D9 by corresponding actuators A1 through A15. Also, a RAM 129 is memory means for memorizing a map shown in FIG. 20 and other necessary data.

Herein, the air conditioning modes (conditioned-air blow-off modes) provided by opening and closing the above-described respective doors D3, D4, D5, D8, D9, D10 include in total eight modes (see FIGS. 18 and 20) of the vent mode m1, roof open vent mode m2, bi-level mode m3, foot mode m5, roof open foot mode m4, def/foot mode m6, def mode m7, and shut mode m8. When the auto changing switch 124 is OFF (during the manual selection), the CPU 127 selects, based on manually-operated input of the mode control dial 116, the modes (roof open vent mode m2, roof open foot mode m4) which correspond to the open state of the roof 4, and the modes (vent mode m1, foot mode m5) which correspond to the closed state of the roof 4. As a result, respective doors are controlled as shown in FIG. 20.

Figure 22:
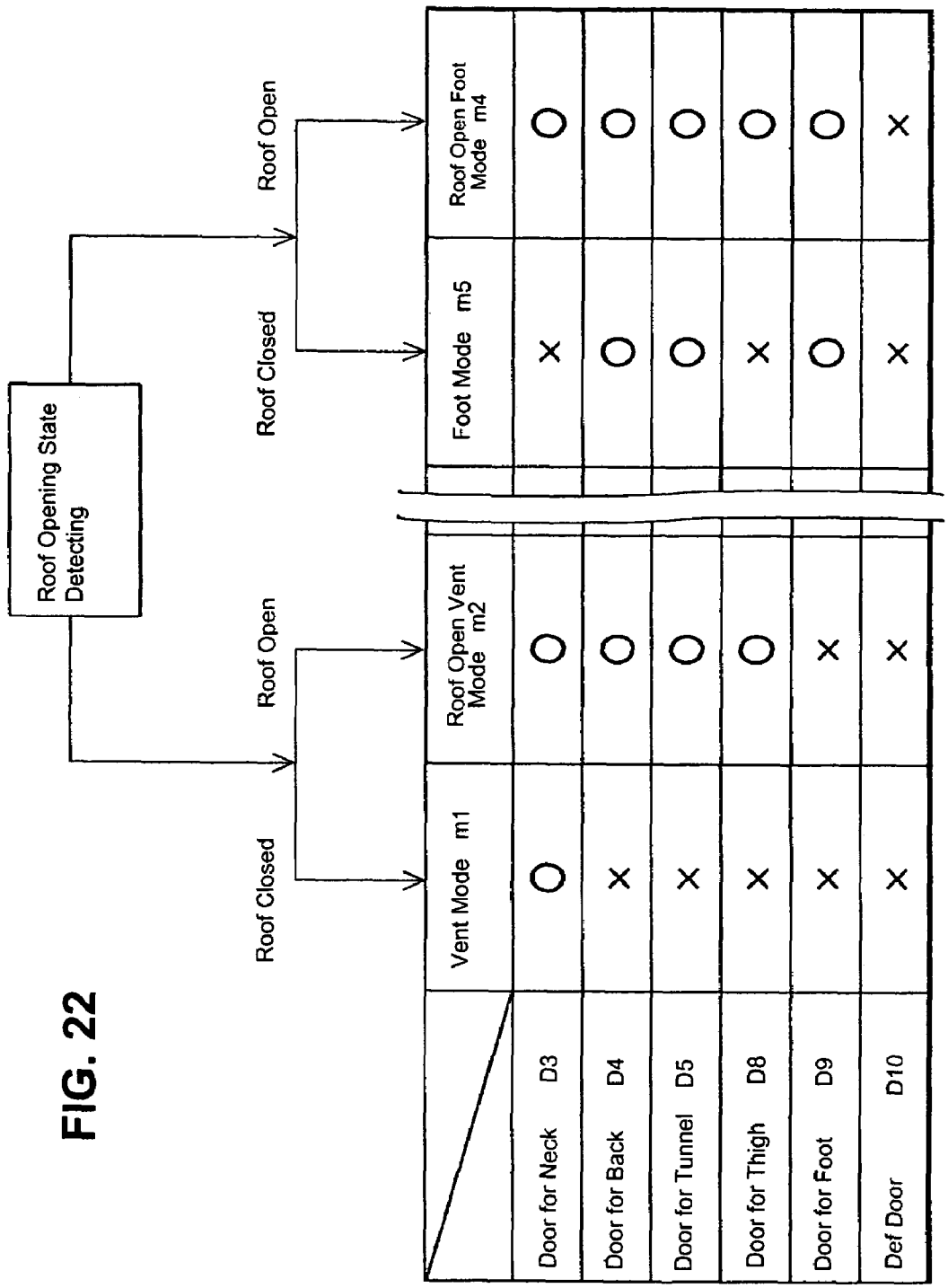

Meanwhile, when the auto changing switch 124 is ON (during the auto selection), the CPU 127 automatically selects (see FIG. 22), based on the roof opening state detected by the roof opening detecting switch 126, the modes (roof open vent mode m2, roof open foot mode m4) which correspond to the open state of the roof 4, and the modes (vent mode m1, foot mode m5) which correspond to the closed state of the roof 4. As a result, respective doors are controlled as shown in FIGS. 20 or 22.

FIG. 20 is a map which memorizes opening states of respective doors corresponding to respective modes m1 through m8, with a rank of air conditioning modes to be selected by the mode control dial 116, which are the vent mode m1, roof open vent mode m2, bi-level mode m3, foot mode m5, roof open foot mode m4, def/foot mode m6, def mode m7, shut mode m8, and with a column of driven doors which are the doors for neck D3, doors for back D4, doors for tunnel D5, doors for thigh D8 and doors for foot D9, def doors D10, air mix doors D1, D2. Herein, ○ mark shows a door open state and X shows a door closed state.

The CPU 127 as the control portion reads data from the map of the RAM 129 (see FIG. 20) according to inputs from respective elements 126, 124, 125, 123, 116, 117, and 118 and controls opening of respective doors. Herein, when the driver-seat operating mode m9 is selected by the seat-mode changing portion 123, only doors at the driver seat DR side are controlled. Meanwhile, when the passenger-seat operating mode m10 is selected by the seat-mode changing portion 123, only doors at the passenger seat PA side are controlled. Further, when the dual mode m11 is selected by the seat-mode changing portion 123, both doors at the driver seat DR side and the passenger seat PA side are controlled.

Figure 21:
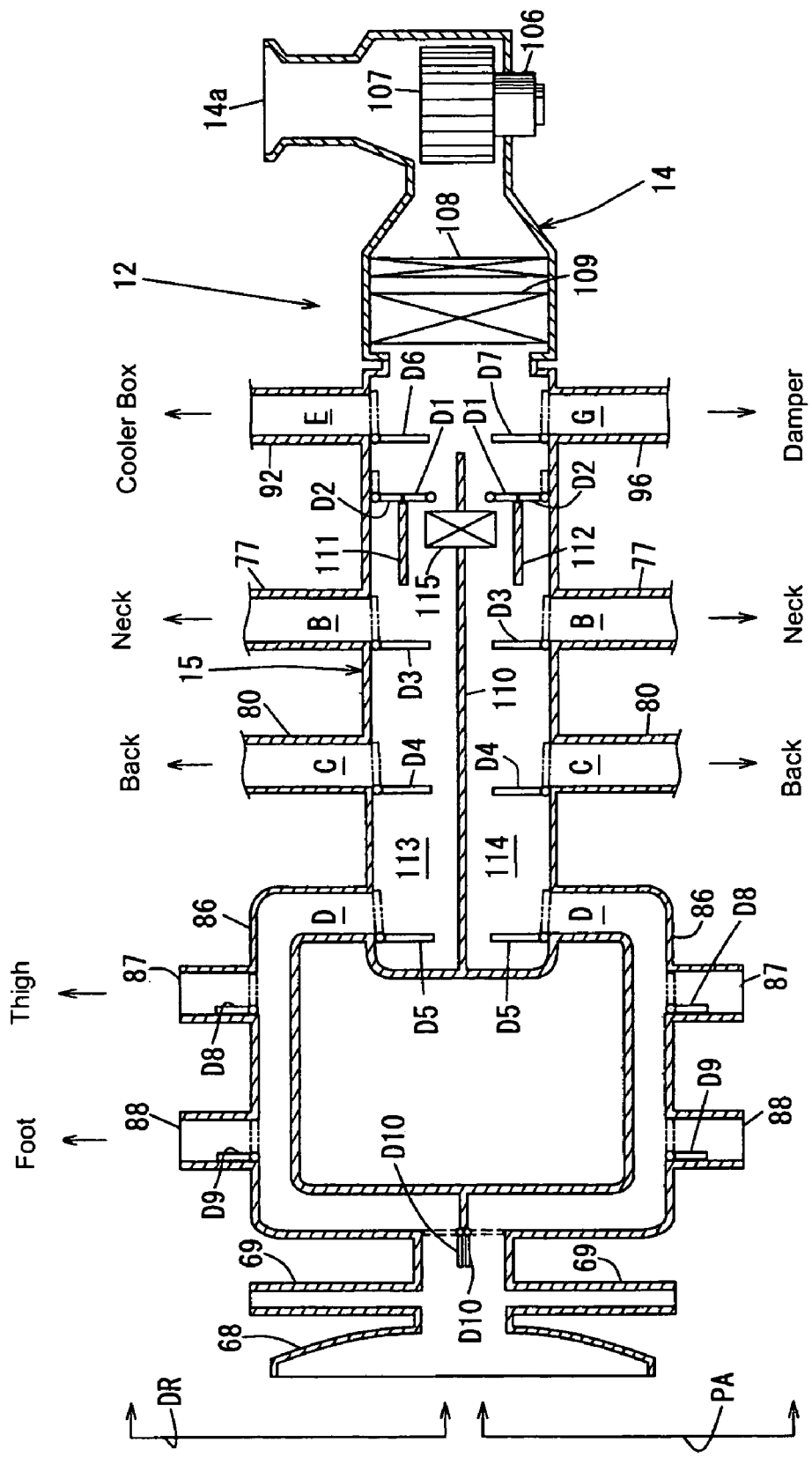
FIG. 21 is a sectional view of the air conditioner with air mix door which is switched to a high-temperature setting side.

Herein, the air mix doors D1, D2 for temperature adjustment are controlled in the sate (a) shown in FIG. 17 when a low temperature t18 is selected, and controlled in the state (b) shown in FIG. 21 when a high temperature t32 is selected. Meanwhile, for a temperature between the low temperature t18 and the high temperature t32, the doors are controlled automatically so as to provide a proper temperature needed by passengers according to operation of the temperature control dial 118. Although the low temperature t18 is set at approximately 18° C. and the high temperature t32 is set at approximately 32° C. in the present embodiment, those should not be limited to these values.

Next, opening state of the doors D3–D5, D8–D10 at respective air conditioning modes m1-m8 will be described referring to FIG. 20.

[Vent Mode m1]

At the vent mode m1, only the doors for neck D3 are opened, while other doors D4, D5, D8, D9 and D10 are closed. The conditioned air is blown off toward the respective necks of the passengers from the blowoff ports for neck 79 shown in FIG. 9.

[Roof Open Vent Mode m2]

At the roof open vent mode m2, the doors for neck D3, the doors for back D4, the doors for tunnel D5 and the doors for thigh D8 are opened, while other doors D9 and D10 are closed. The conditioned air is blown off toward the respective necks, backs and thighs of the passengers from the blowoff ports for neck 79, the blowoff ports for back 82 and the blowoff ports for thigh 87 shown in FIG. 9.

[Bi-level Mode m3]

At the bi-level mode m3, the door for neck D3, the doors for tunnel D5 and the doors for foot D9 are opened, while other doors D4, D8 and D10 are closed. The conditioned air is blown off toward the respective necks and feet of the passengers from the blowoff ports for neck 79 and the blowoff ports for foot 88 shown in FIG. 9.

[Foot Mode m5]

At the foot mode m5, the doors for back D4, the doors for tunnel D5 and the doors for foot D9 are opened, while other doors D3, D8 and D10 are closed. The conditioned air is blown off toward the respective necks and feet of the passengers from the blowoff ports for back 82 and the blowoff ports for foot 88 shown in FIG. 9.

[Roof Open Foot Mode m4]

At the roof open foot mode m4, the door for neck D3, the door for back D4, the doors for tunnel D5, the doors for thigh D8 and the doors for foot D9 are opened, while other doors D10 is closed. The conditioned air is blown off toward the respective necks, backs, thighs and feet of the passengers from the blowoff ports for neck 79, the blowoff ports for back 82, the blowoff ports for thigh 87 and the blowoff ports for foot 88 shown in FIG. 9.

[Def/Foot Mode m6]

At the def-foot mode m6, the doors for back D4, the doors for tunnel D5, the doors for foot D9 and the def doors D10 are opened, while other doors D3 and D8 are closed. The conditioned air is blown off toward the respective backs and feet of the passengers from the blowoff ports for back 82 and the blowoff ports for foot 88 shown in FIGS. 9 and 16, and defroster of the windshield is executed by the conditioned air from the front defroster duct 68 and the side defroster duct 69.

[Def Mode m7]

At the def mode m7, the doors for tunnel D5 and the def doors D10 are opened, while other doors D3, D4, D8 and D9 are closed. Defroster of the windshield is executed by the conditioned air from the front defroster duct 68 and the side defroster duct 69 shown in FIG. 16.

[Shut Mode m8]

At the shut mode m8, all doors D3, D4, D5, D8, D9 and D10 are closed.

FIG. 22 is an explanatory diagram when the auto-changing switch 124 shown in FIGS. 18 and 19 is turned ON. In the event that either the vent mode m1 or the roof open vent mode m2 is auto-selected, when the closed state of vehicle roof 4 is detected by the roof opening detecting sensor 126, the vent mode m1 is auto-selected and the conditioned air is blown off from only the blowoff ports for neck 79 by opening the doors for neck D3. Meanwhile, when the open state of vehicle roof 4 is detected by the sensor 126, the roof open vent mode m2 is auto-selected and the conditioned air is blown off from the blowoff ports for neck 79 and other ports 82 and 87 by opening the doors for neck D3, the doors for back D4, the doors for tunnel D5 and the door for thigh D8.

Also, in the event that either the foot mode m5 or the roof open foot mode m4 is auto-selected, when the closed state of vehicle roof 4 is detected, the foot mode m5 is auto-selected and the conditioned air is blown off from the blowoff ports for back 82 and the blowoff ports for foot 88 by opening the doors for back D4, the doors for tunnel D5 and the doors for foot D9 along with closing the doors for neck D3 to prevent blowoff from the ports for neck 79. Meanwhile, when the open state of vehicle roof 4 is detected, the roof open foot mode m4 is auto-selected and the conditioned air is blown off from the blowoff ports for neck 79, blowoff ports of back 82, blowoff ports of thigh 87 and blowoff ports for foot 88 by opening all doors D3, D4, D5, D8 and D9 except the def doors D10.

Figure 23:
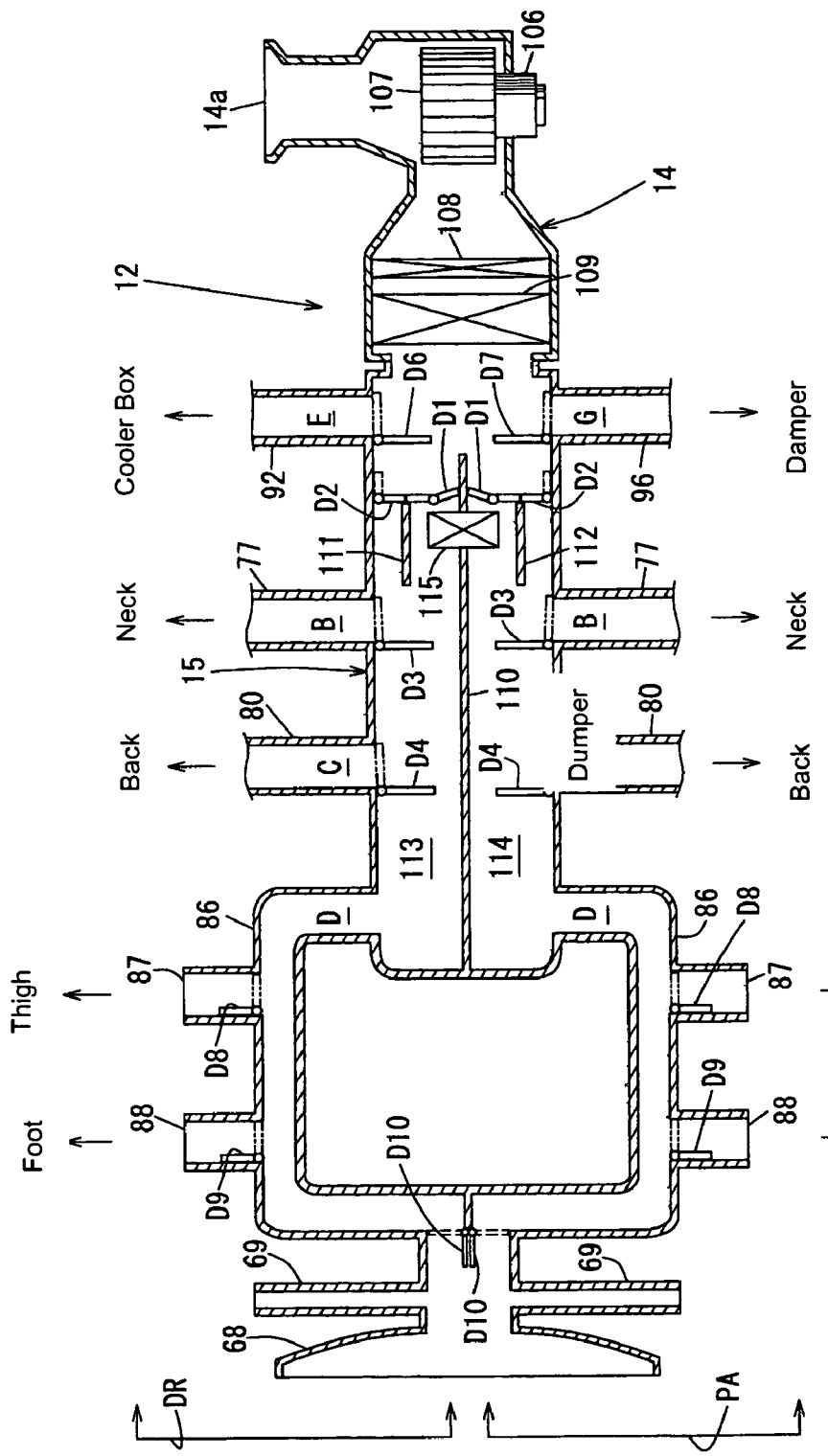
FIG. 23 is a sectional view showing another embodiment of the air conditioner for a vehicle.

Herein, the doors for tunnel D5 may be omitted as shown in FIG. 23, so that reduction of parts number and simple structure and control can be attained.

In the present embodiment described above, there is provided the air conditioner for a vehicle including the vehicle roof 4 (see FIG. 1) capable of opening, comprising the driver seat (right-side seat 22) and the passenger seat (left-side seat 22) which are provided at right and left sides in the vehicle compartment 2, plural conditioned-air blowoff ports 79, 82, 87, 88 (see FIG. 9) provided for the driver seat and the passenger seat, respectively, and the air conditioning control device 100 (see FIG. 19) operative to adjust respective characteristics of conditioned air for the driver seat and the passenger seat, separately.

Accordingly, the conditioned air whose respective characteristics for the driver seat DR and the passenger seat PA are adjusted separately by the air conditioning control device 100 can be blown off from the conditioned-air blowoff ports 79, 82, 87, 88 for the driver seat DR and the passenger seat PA. Thus, since the air conditioning is adjusted separately for the driver seat and the passenger seat, the air conditioning control can be attained so as to satisfy needs of each passenger on the driver seat and the passenger seat during the vehicle driving with the vehicle roof 4 open, thereby improving the comfortableness of air conditioning.

Further, as shown in FIG. 18, there is provided the air conditioning adjusting operating means 101 for adjusting the air conditioning control device 100, wherein the air conditioning adjusting operating means 101 is configured so as to adjust the conditioned air for the driver seat and the passenger seat by changing one assembled operating member 119 (see FIG. 19).

Accordingly, since the characteristics for the driver seat and the passenger seat can be adjusted by changing the one assembled operating member 119, a simple structure can be obtained with only the one assembled operating member 119. Namely, there is no need to provide two assembled operating members for the driver seat and the passenger seat, respectively.

Further, the one assembled operating member 119 includes, as shown in FIGS. 18 and 19, the mode changing operating portion (see the mode control dial 116), the air-amount changing operating portion (see the air-amount control dial 117) and the temperature adjusting operating portion (see the temperature control dial 118), and there is provided the seat-mode changing operating portion 123 which changes at least the mode changing operating portion (see the mode control dial 116) and the temperature adjusting operating portion (see the temperature control dial 118) to the driver-seat operating mode m9 and the passenger-seat operating mode m10.

Accordingly, since air-amount adjusting and temperature adjusting can be provided separately for the driver seat DR and the passenger seat PA by the seat-mode changing operating portion 123, further proper air-conditioning control for each passenger can be attained.

Further, the seat-mode changing operating portion 123 includes the dual mode m11 operative to adjust the identical air conditioning characteristics for the driver seat DR and the passenger seat PA thereby.

Accordingly, since the dual mode m11 selected by the seat-mode changing operating portion 123 can provide the driver seat DR and the passenger seat PA with the identical air conditioning characteristics, such simple selecting operation can improve an easy use.

Additionally, the state of the vehicle roof 4 is detected by the roof opening detecting switch 126, and the separate adjusting of the conditioned air for the driver seat DR and the passenger seat PA is operative when the vehicle roof 4 is in the open state, whereas the dual mode m11 is operative when the vehicle roof 4 is in the closed state.

Accordingly, the air conditioning can be adjusted separately for the driver seat and the passenger seat during the roof open for the purpose of satisfying each passenger's needs, and can be adjusted at the dual mode m11 during the roof closed for the purpose of the load reducing. As a result, the efficient air conditioning can be attained, preventing too much load from being applied to the air conditioner.

Also, there is further provided the passenger-seat shutdown mode to stop the air conditioning control for the passenger seat PA.

Accordingly, since the air conditioning control for the passenger seat PA is stopped by selecting of the passenger-seat shutdown mode, the air conditioning focused on the driver seat DR can be attained in this case and thereby attaining an easy operation.

Further, there is provided the passenger-seat shutdown switch 125 to select the passenger-seat shutdown mode.

Accordingly, the passenger-seat shutdown mode can be selected simply by the passenger-seat shutdown switch 125. Particularly, since there is provided the single passenger-seat shutdown switch 125 in the present embodiment, the passenger-seat shutdown mode can be obtained promptly and easily by one-touching operation or one-pushing operation of the switch 125.

Additionally, the mode (see the def mode m7 and the def/foot mode m6) including the defroster for the passenger seat PA is not selectable during the separate adjusting of the conditioned air for the passenger seat PA.

Accordingly, since selecting of the mode (see the def mode m7 and the def/foot mode m6) including the defroster is prohibited during the separate adjusting of the conditioned air for the passenger seat PA, the mistaken selection of these modes m6, m7 against the driver's expectation can be prevented certainly.

Further, there is further provided plural conditioned-air blowoff modes (see the vent mode m1, roof open mode m2, bi-level mode m3, foot mode m5, roof open foot mode m4, def/foot mode m6, def mode m7, shut mode m8), wherein there are provided respective modes for the open state of the vehicle roof 4 and the closed state of the vehicle roof 4, and the air conditioning control device 100 is configured so as to be further operative to select the respective modes.

Accordingly, since the air conditioning device 100 selects the modes (the roof open mode m2 or the roof open foot mode m4, corresponding to the roof open state; the vent mode m1 or the foot mode m5, corresponding to the roof closed state) which respectively correspond to the open state of the vehicle roof 4 (roof open state) and the closed state of the vehicle roof 4 (roof closed state), preferable modes m2, m4; m1, m5 for each open and closed states of the vehicle roof 4 can be selected. Thus, the comfortable air conditioning can be provided for both opening and closed states of the vehicle roof, and particularly even if the roof is open, the passengers can obtain comfortable air conditioning.

Further, the air conditioning control device 100 includes the mode changing operating portion (see the mode control dial 116) to select the respective modes m1–m8 manually.

Accordingly, the needed mode can be selected manually by the passenger operating the mode changing operating portion (see the mode control dial 116) according to the roof open state and the roof closed state.

Also, there is further provided plural conditioned-air blowoff modes (see the vent mode m1, roof open mode m2, bi-level mode m3, foot mode m5, roof open foot mode m4, def/foot mode m6, def mode m7, shut mode m8), wherein the air conditioning control device 100 is configured so as to be further operative to select automatically the conditioned-air blowoff ports of the conditioned-air blowoff modes according to the state of the vehicle roof 4.

Accordingly, since the air conditioning control device 100 selects automatically the conditioned-air blowoff ports of the conditioned-air blowoff modes according to the state of the vehicle roof 4, the modes m2, m4 for the roof open state and the modes m1, m5 for the roof closed state can be selected automatically and properly according to the according to the opening state of the vehicle roof 4. Thus, no manual operation for the mode selection is necessary, and the comfortable air conditioning can be provided for both opening and closed states of the vehicle roof, and particularly even if the roof is open, the passengers can obtain comfortable automatic air conditioning.

Further, the conditioned-air blowoff ports include at least the blowoff ports for neck 79 to blow off the conditioned air toward the necks of the vehicle passengers.

Accordingly, the air around the necks of passenger can be conditioned efficiently by the conditioned air from the blowoff ports for neck 79.

Also, the conditioned-air blowoff ports include at least the blowoff ports for back 82 to blow off the conditioned air toward the backs of vehicle passengers.

Accordingly, the air around the backs of passengers can be conditioned efficiently by the conditioned air from the blowoff ports for back 82.

Further, the conditioned-air blowoff ports include at least the blowoff ports for thigh 87 to blow off the conditioned air toward thighs of vehicle passengers.

Accordingly, the air around the thighs of passenger can be conditioned efficiently by the conditioned air from the blowoff ports for thigh 87.

Additionally, the conditioned-air blowoff ports include at least the blowoff ports for thigh 87 and the blowoff ports for foot 88 to blow off the conditioned air respectively toward the thighs and feet of vehicle passengers, and there is provided the opening-and-closing means (see the doors for tunnel D5) to control the both blowoff ports together which is located upstream of the ports.

Accordingly, the air around the thighs and/or the feet of the passengers can be conditioned efficiently by the conditioned air from the blowoff ports for thigh 87 and/or the blowoff ports for foot 88, and the upstream of the blowoff ports for thigh 87 and the blowoff ports for foot 88 can be controlled by the opening-and-closing means (see the doors for tunnel D5) at the same time.

Also, there are further provided the vent modes m1, m2 to blow off the conditioned air toward the necks of vehicle passengers, wherein the conditioned air is operative to be blown off only from the blowoff ports for neck 79 to blow off the conditioned air toward the necks of vehicle passengers when the vehicle roof 4 is in the closed state (see the vent mode m1), whereas the conditioned air is operative to be blown off from the blowoff ports for neck 79 and other blowoff ports (see the blowoff ports 82, 87) when the vehicle roof is in the open state (see the roof open vent mode m2).

Accordingly, since the outside air does not come into the vehicle compartment from the roof 4 when the vehicle roof 4 is in the closed state (see the vent mode m1), the passenger can feel sufficiently the comfortable conditioned air from the blowoff ports for neck 79. Meanwhile, the outside air comes into the vehicle compartment from the roof when the vehicle roof is in the open state (see the roof open vent mode m2) and therefore the conditioned air only from the blowoff ports for neck 79 may be not enough for the passenger. However, the conditioned air can be blown off from the blowoff ports for neck 79 and other blowoff ports 82, 87, thereby air-conditioning the passenger effectively.

Namely, the proper air conditioning where the passenger can feel the conditioned air sufficiently can be provided according to the roof closed state and the roof open state.

Further, the conditioned air is operative to be blown off from the blowoff ports for neck 79, the blowoff ports for back 82 and the blowoff ports for thigh 87 when the vehicle roof is in the open state (see the roof open vent mode m2) at the vent mode.

Accordingly, the air conditioning can be provided more properly when the vehicle roof is in the open state (see the roof open vent mode m2).

Also, there are further provided foot modes m5, m4 to blow off the conditioned air toward the feet of vehicle passengers, wherein the conditioned air is prevented from being blown off from blowoff ports for neck 79 when the vehicle roof 4 is in the closed state (see the foot mode m5).

Accordingly, although the foot mode m5 allows warm conditioned air to be blown off, this warm conditioned air is prevented from being blown off from the blowoff ports for neck 79, thereby avoiding to provide an uncomfortable feeling to the passenger.

Further, the conditioned air is operative to be blown off from the blowoff ports for foot 88 and at least one of other blowoff ports 79, 82, 87 when the vehicle roof is in the open state (see the roof open foot mode m4) at the foot mode.

When the vehicle roof 4 is open, the outside air comes into the vehicle compartment from the open roof 4, and thus it may be difficult for the passenger to feel the proper air conditioning by the conditioned air only from the blowoff ports for foot 88. However, according to the above structure, the conditioned air is blown off from the blowoff ports for foot 88 and other blowoff ports 79, 82, 87 during the roof open state, and thereby the passenger can feel more comfortable air conditioning.

With regard to the correspondence in structure between the present invention and the above-mentioned embodiment, the driver seat corresponds to the right-side seat 22 facing to the steering wheel 23; the passenger seat corresponds to the left-side seat 22; the conditioned-air blowoff ports correspond to the blowoff ports for neck 79, blowoff ports for back 82, blowoff ports for thigh 87 and blowoff ports for foot 88; the mode changing operating portion corresponds to the mode control dial 116; the air-amount changing operating portion corresponds to the air-amount control dial 117; the temperature adjusting operating portion corresponds to the temperature control dial 118; plural conditioned-air blowoff modes correspond to the vent mode m1, roof open mode m2, bi-level mode m3, foot mode m5, roof open foot mode m4, def/foot mode m6, def mode m7, shut mode m8; the modes corresponding to the roof open state correspond to the roof open mode m2 and the roof open foot mode m4; the modes corresponding to the roof closed state correspond to the vent mode m1 and the foot mode m5; and the opening-and-closing means corresponds to the doors for tunnel D5.

However, the invention should not be limited to the above-described embodiment. Any other modifications may be applied within the scope of a spirit of the present invention.

What is claimed is:

1. An air conditioner for a vehicle including a vehicle roof capable of opening, comprising:
   a driver seat and a passenger seat which are provided at right and left sides in a vehicle compartment;
   plural conditioned-air blowoff ports provided for said driver seat and said passenger seat, respectively; and
   an air conditioning control device operative to adjust respective characteristics of conditioned air for said driver seat and said passenger seat, separately,
   wherein there is provided air conditioning adjusting operating means for adjusting said air conditioning control device, and said air conditioning adjusting operating means is configured so as to adjust the conditioned air for said driver seat and said passenger seat by changing one assembled operating member,
   wherein said one assembled operating member includes a mode changing operating portion, an air-amount changing operating portion and a temperature adjusting operating portion, and there is provided a seat-mode changing operating portion which changes at least said mode changing operating portion and said temperature adjusting operating portion to a driver-seat operating mode and a passenger-seat operating mode.

2. The air conditioner for a vehicle of claim 1, wherein said seat-mode changing operating portion includes a dual mode operative to adjust the identical air conditioning characteristics for said driver seat and said passenger seat thereby.

3. The air conditioner for a vehicle of claim 2, wherein a state of said vehicle roof is detected, and said separate adjusting of the conditioned air for said driver seat and said passenger seat is operative when the vehicle roof is in an open state, whereas said dual mode is operative when the vehicle roof is in a closed state.

4. The air conditioner for a vehicle of claim 1, further comprising a passenger-seat shutdown mode to stop the air conditioning control for said passenger seat.

5. The air conditioner for a vehicle of claim 4, wherein there is provided a passenger-seat shutdown switch to select said passenger-seat shutdown mode.

6. The air conditioner for a vehicle of claim 1, wherein a mode including a defroster for said passenger seat is prohibited from being selected during said separate adjusting of the conditioned air for said passenger seat.

7. The air conditioner for a vehicle of claim 1, further comprising plural conditioned-air blowoff modes, wherein said air conditioning control device is configured so as to be further operative to select automatically said conditioned-air blowoff ports in the conditioned-air blowoff modes according to the state of said vehicle roof.

8. An air conditioner for a vehicle including a vehicle roof capable of opening, comprising:
   a driver seat and a passenger seat which are provided at right and left sides in a vehicle compartment;
   plural conditioned-air blowoff ports provided for said driver seat and said passenger seat, respectively;
   an air conditioning control device operative to adjust respective characteristics of conditioned air for said driver seat and said passenger seat, separately, and
   plural conditioned-air blowoff modes, wherein there are provided respective modes for an open state of said vehicle roof and a closed state of said vehicle roof, and said air conditioning control device is configured so as to be further operative to select said respective modes,
   wherein there is further provided a vent mode to blow off the conditioned air toward the neck of a vehicle passenger on at least one of said driver seat and said passenger seat, wherein the conditioned air is operative to be blown off only from a neck blowoff port to blow off the conditioned air toward the neck of a vehicle passenger on at least one of said driver seat and said passenger seat when the vehicle roof is in the closed state, whereas the conditioned air is operative to be blown off from said neck blowoff port and another blowoff port when the vehicle roof is in the open state.

9. The air conditioner for a vehicle of claim 8, wherein the conditioned air is operative to be blown off from said neck blowoff port, a back blowoff port to blow off the conditioned air toward the back of the vehicle passenger on at least one of said driver seat and said passenger seat, and a thigh blowoff port to blow off the conditioned air toward the thigh of the vehicle passenger on at least one of said driver seat and/or said passenger seat when the vehicle roof is in the open state at said vent mode.

10. The air conditioner for a vehicle of claim 8, further comprising a foot mode to blow off the conditioned air toward the foot of a vehicle passenger on at least one of said driver seat and said passenger seat, wherein the conditioned air is prevented from being blown off from a neck blowoff port to blow off the conditioned air toward the neck of a vehicle passenger on at least one of said driver seat and/or said passenger seat when the vehicle roof is in the closed state.

11. The air conditioner for a vehicle of claim 10, wherein the conditioned air is operative to be blown off from said foot blowoff port and at least another blowoff port when the vehicle roof is in the open state at said foot mode.

12. The air conditioner for a vehicle of claim 8, wherein said air conditioning control device includes a mode changing operating portion to select said respective modes manually.

13. The air conditioner for a vehicle of claim 8, wherein said conditioned-air blowoff ports include at least a neck blowoff port to blow off the conditioned air toward the neck of a vehicle passenger on at least one of said driver seat and said passenger seat.

14. The air conditioner for a vehicle of claim 8, wherein said conditioned-air blowoff ports include at least a back blowoff port to blow off the conditioned air toward a back of a vehicle passenger on at least one of said driver seat and said passenger seat.

15. The air conditioner for a vehicle of claim 8, wherein said conditioned-air blowoff ports include at least a thigh blowoff port to blow off the conditioned air toward a thigh of a vehicle passenger on at least one of said driver seat and said passenger seat.

16. The air conditioner for a vehicle of claim 8, wherein said conditioned-air blowoff ports include at least a thigh blowoff port and a foot blowoff port to blow off the conditioned air respectively toward the thigh and the foot of a vehicle passenger on at least one of said driver seat and said passenger seat, and there is provided an opening-and-closing means to control said both blowoff ports together which is located upstream of the ports.

* * * * *